US008284652B2

(12) United States Patent
Jou et al.

(10) Patent No.: US 8,284,652 B2
(45) Date of Patent: Oct. 9, 2012

(54) ENHANCED FORWARD LINK TRANSMISSION

(75) Inventors: Yu-Cheun Jou, San Diego, CA (US); Rashid Ahmed Akbar Attar, San Diego, CA (US); Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 379 days.

(21) Appl. No.: 12/606,313

(22) Filed: Oct. 27, 2009

(65) Prior Publication Data

US 2010/0103904 A1    Apr. 29, 2010

Related U.S. Application Data

(60) Provisional application No. 61/109,122, filed on Oct. 28, 2008, provisional application No. 61/109,129, filed on Oct. 28, 2008.

(51) Int. Cl.
*H04J 11/00* (2006.01)
*H04W 4/00* (2009.01)

(52) U.S. Cl. .................... 370/209; 370/331; 370/338

(58) Field of Classification Search .................. 370/209, 370/328, 331, 338
See application file for complete search history.

(56) References Cited

U.S. PATENT DOCUMENTS

| 2006/0270443 | A1* | 11/2006 | Lundby et al. ............. 455/522 |
| 2007/0008935 | A1* | 1/2007 | Take ......................... 370/335 |
| 2007/0076663 | A1* | 4/2007 | Qi et al. ..................... 370/331 |
| 2007/0110015 | A1* | 5/2007 | Chakraborty et al. ....... 370/338 |
| 2007/0153748 | A1* | 7/2007 | Shapira ....................... 370/338 |
| 2007/0195900 | A1* | 8/2007 | Lee et al. .................... 375/260 |
| 2008/0167049 | A1* | 7/2008 | Karr et al. ................ 455/456.2 |
| 2008/0205322 | A1* | 8/2008 | Cai et al. .................... 370/312 |
| 2009/0129334 | A1* | 5/2009 | Ma et al. .................... 370/331 |

FOREIGN PATENT DOCUMENTS

WO    WO03007647    1/2003

OTHER PUBLICATIONS

International Search Report & Written Opinion—PCT/US2009/062348, International Search Authority—European Patent Office—Mar. 15, 2010.
Ruprecht J et al: "Performance, service provision and implementation issues of cellular code time division multiple access" Spread Spectrum Techniques and Applications Proceedings, 1996., IEEE 4 th International Symposium on Mainz, Germany Sep. 22-25, 1996, New York, NY, USA,IEEE, US, vol. 1, Sep. 22, 1996, pp. 344-350, XP010208590 ISBN: 978-0-7803-3567-7 Paragraph I I . Paragraph IV.B.

* cited by examiner

*Primary Examiner* — Brandon Renner
(74) *Attorney, Agent, or Firm* — Jeffrey D. Jacobs

(57) ABSTRACT

A method for processing forward link channel signals generated by a CDMA base station includes time sharing by several mobile stations of spreading codes, which are orthogonal codes such as Walsh Code, and code-combining soft/softer handoff across sectors in the mobile station active set to increase dimensions on the CDMA2000 and WCDMA downlink while minimizing intra-sector interference. Since different parts of a packet or frame are transmitted to the user by the different base stations in the active set, earlier decoding and therefore early packet termination is enabled.

29 Claims, 14 Drawing Sheets

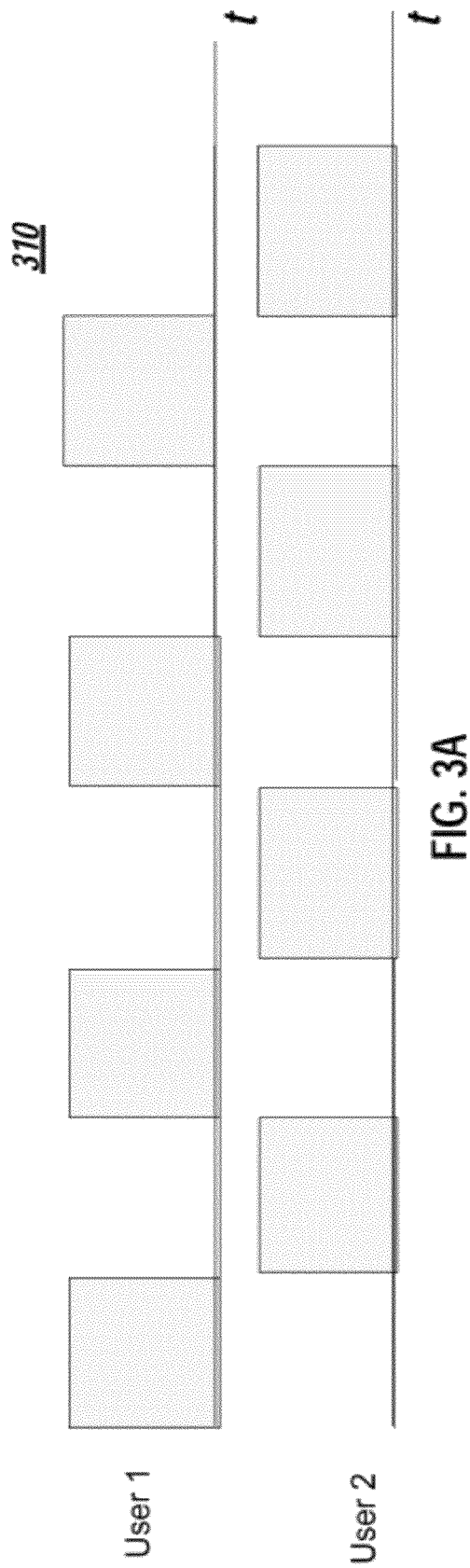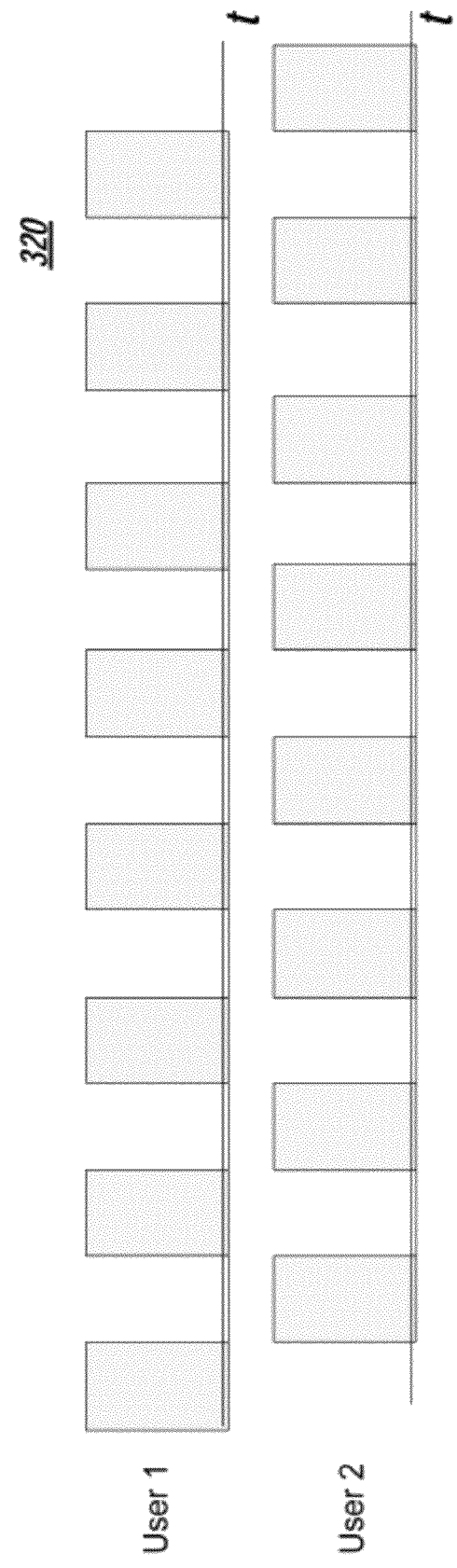

ENHANCED FORWARD LINK TRANSMISSION

CROSS-REFERENCE TO RELATED APPLICATIONS

This application claims the benefit of U.S. Provisional Application Nos. 61/109,122 and 61/109,129, both filed on Oct. 28, 2008, which disclosures are incorporated herein by reference in their entirety for all purposes.

BACKGROUND

Wireless communication has become a popular way to communicate and is overtaking wired communication. Wireless communication is used for all kinds of communication including voice, data, etc. The popularity of wireless communication has resulted in setting up more wireless communication systems, including multiple-access systems, which are capable of supporting communication with multiple users by sharing available system resources (e.g., bandwidth and transmit power). Some examples of multiple-access systems include code division multiple access (CDMA) systems, time division multiple access (TDMA) systems, frequency division multiple access (FDMA) systems, and orthogonal frequency division multiple access (OFDMA) systems.

Multiple-access systems used in wireless communication can simultaneously support communication for multiple wireless terminals. Each terminal communicates with one or more base stations by sending transmissions on the forward and reverse links. The forward link, which is also referred to as the downlink, is the communication link from the base stations to the terminals or mobile stations. The reverse link, which is also referred to as the uplink, is the communication link from the terminals or mobile stations to the base stations. Both the forward link and reverse link can be established through a single-in-single-out system, multiple-in-single-out system, or a multiple-in-multiple-out (MIMO) system.

MIMO systems use multiple transmit antennas and multiple receive antennas for data transmission. Multicarrier systems, can provide improved performance by enabling the use of two or more carrier frequencies for information transmission, which can lead to higher throughput and/or greater reliability. However, there are problems associated with multicarrier systems which can affect their performance, such as the division of power among the multiple carriers. For example, the division and allocation of power among different multiple carriers can be difficult, and if it is not done correctly, can result in signal degradation.

Although some communication systems have increased the bandwidth available for wireless communication, there is still further demand brought on by the increased popularity of wireless communication. Techniques such as using multiple carrier frequencies to transmit more data have helped increase the available bandwidth but have introduced other problems. For example, both CDMA2000 and WCDMA are quickly becoming code-space limited in the forward link. This is occurring because the growth in capacity of these systems is limited by the available number of orthogonal codes. CDMA2000 has attempted to solve these capacity problems by introducing Quasi-Orthogonal Functions (QOF), which have the negative side effect of causing intra-sector interference. WCDMA has also attempted to solve this capacity problem by assigning extra PN codes to the same cell, which also has the negative side effect of causing intra-sector interference. In order to address the intra-sector interference produced by both of these approaches, cancellation techniques are used to increase downlink capacity. However, cancellation techniques can create other problems such as cancellation of desired signals.

SUMMARY

Embodiments provide techniques that increase available dimensions (code-space) on the CDMA2000 and WCDMA downlink while minimizing intra-sector interference. By increasing available dimensions, higher throughput and/or greater reliability is achieved, which results in an increased number of users and mobile stations that can be served.

Several users can time share spreading codes, which are orthogonal codes such as Walsh Codes. This time sharing is coupled with code-combining soft/softer handoff (CCSH) across sectors in the mobile station active set to increase dimensions on the CDMA2000 and WCDMA downlink while reducing intra-sector interference. Since different parts of a data frame are transmitted to the user by the different base stations in the active set during a single time domain, earlier decoding and therefore early termination of the frame transmission is enabled.

In an embodiment, a method includes receiving at a first mobile station a first component of a first signal transmitted by a first base station, receiving at the first mobile station a third component of a second signal transmitted by a second base station, and decoding at the first mobile station the first component and the third component. The first signal includes the first component that has been coded using a spreading code and a second component that has been coded using the spreading code. The first component is time domain multiplexed with the second component. The second signal includes the third component that has been coded using the spreading code and a fourth component that has been coded using the spreading code. The third component is also time domain multiplexed with the fourth component. The first mobile station is in a soft or softer handoff condition with the first base station and the second base station. The first component and the third component can be combined to form a complete message. The method can further include sending a signal to terminate sending data used to form the complete message. The spreading code can be an orthogonal code such as a Walsh Code.

In a further embodiment, the first component and the third component are received by the mobile station at substantially the same time. Alternatively, the first component and the third component can be received by the mobile station during a time period of less than 20 milliseconds.

In yet another embodiment, the second component and the fourth component are combined to form a complete message.

In yet another embodiment, the method further includes receiving at a second mobile station the second component of the first signal transmitted by the first base station, receiving at the second mobile station the fourth component of the second signal transmitted by a second base station, and decoding at the second mobile station the second component and the fourth component. The second mobile station is in a soft handoff condition with the first base station and the second base station.

In yet another embodiment, the method includes sending a signal to the first base station and the second base station that data for a frame has been received.

In yet another embodiment, the first component can be time domain multiplexed with the second component over a period of 20 milliseconds. The first component can occupy the first 10 milliseconds and the second component can occupy the second 10 milliseconds. The third component can be time domain multiplexed with the fourth component over a period of 20 milliseconds. The third component can occupy the first 10 milliseconds and the fourth component can occupy the second 10 milliseconds.

In another embodiment, a system includes an antenna configured to transmit and receive data from a first base station and a second base station, a memory configured to store instructions and to store data including the first component and the third component and a processor configured to use the instructions to decode the first component and the third component. The data received from the first base station includes a first component and a second component that have been coded using a spreading code. The data received from the second base station includes a third component and a fourth component that have been coded using the spreading code. The system is in a soft or softer handoff condition with the first base station and the second base station. The processor can be configured to combine the first component and the third component to form a complete message. The processor can also be configured to decode the first component and the second component using a Walsh Code. The processor can be further configured to determine that a complete message has been received and to prepare a signal requesting the first base station and the second base station stop sending data used to form the complete message.

In yet another embodiment, a computer program product includes a processor-readable medium storing processor-readable instructions configured to cause a processor to collect a first component of a first signal transmitted by a first base station, collect a third component of a second signal transmitted by a second base station, decode the first component and the third component, and transition between the first base station and the second base station with at least one of a soft or softer handoff. The first signal includes the first component that has been coded using a spreading code and a second component that has been coded using the spreading code. The first component is time domain multiplexed with the second component. The second signal includes the third component that has been coded using the spreading code and a fourth component that has been coded using the spreading code. The third component is time domain multiplexed with the fourth component. The instructions can be further configured to cause the processor to combine the first component and the third component to form a complete message. The instructions can cause the processor to send a signal to terminate sending data used to form the complete message. The instructions, which cause the processor to decode the first component and the third component, can be performed at substantially the same time. The instructions, which cause the processor to decode the first component and the third component, can be performed during a time period of less than 20 milliseconds.

In yet another embodiment, a method includes dividing a first frame into components including a first component and a second component, dividing a second frame into components including a third component and a fourth component, encoding the first component, the second component, the third component and the fourth component with a spreading code, transmitting at a first base station a first signal that includes the encoded first component and the encoded second component, transmitting at a second base station a second signal that includes the encoded third component and the encoded fourth component, and determining whether a third signal has been received from a mobile station indicating that transmission of the first signal and the second signal can be terminated. Upon determining that the third signal has been received, stopping the transmission of the first signal and the second signal. The second signal can be transmitted at substantially the same time as the first signal is transmitted. The first component can be time domain multiplexed with the second component and the third component is time domain multiplexed with the fourth component. The encoded first component and the encoded third component can be combined to form a complete message. The encoded second component and the encoded fourth component can also be combined to form a complete message. The spreading code can be an orthogonal code such as a Walsh Code. The first component can be time domain multiplexed with the second component over a period of 20 milliseconds and the first component can occupy the first 10 milliseconds and the second component can occupy the second 10 milliseconds. The third component can also be time domain multiplexed with the fourth component over a period of 20 milliseconds and the third component can occupy the first 10 milliseconds and the fourth component can occupy the second 10 milliseconds.

In yet another embodiment, a system includes a processor, a base station interface, a first base station and a second base station. The processor can be configured to divide a first frame into components including a first component and a third component, divide a second frame into components including a second component and a fourth component, and encode the first component, the second component, the third component and the fourth component with a spreading code. The base station interface can be configured to transmit the encoded first component and the encoded second component to a first base station and to transmit the encoded third component and the encoded fourth component to a second base station. The first base station can be configured to transmit the encoded first component and the encoded second component. The second base station can be configured to transmit the encoded third component and the encoded fourth component at substantially the same time as the first base station transmits the encoded first component and the encoded second component. The first base station and the second base station can be in a soft or softer handoff conditions with a mobile station. The first component can be time domain multiplexed with the second component and the third component can be time domain multiplexed with the fourth component. The spreading code can be an orthogonal code such as a Walsh Code.

In yet another embodiment, a computer program product includes a processor-readable medium storing processor-readable instructions configured to cause a processor to divide a first frame into components including a first component and a third component, divide a second frame into components including a second component and a fourth component, encode the first component, the second component, the third component and the fourth component with a spreading code, transmit at a first base station the encoded first component and the encoded second component, transmit at a second base station the encoded third component and the encoded fourth component at substantially the same time as the first base station transmits the encoded first component and the encoded second component. The first component is time domain multiplexed with the second component and the third component is time domain multiplexed with the fourth component. The spreading code can be an orthogonal code such as a Walsh Code.

Further areas of applicability of the present disclosure will become apparent from the detailed description provided hereinafter. The detailed description and specific examples, while indicating various embodiments, are for purposes of illustration only.

BRIEF DESCRIPTION OF THE DRAWINGS

A further understanding of the nature and advantages of the disclosure may be realized by reference to the remaining portions of the specification and the drawings, presented below. The figures are incorporated into the detailed description portion of the disclosure.

FIGS. 3A and 3B are illustrations showing alternative Forward Link Fractional Transmission Patterns.

DETAILED DESCRIPTION

In the following description, for the purposes of explanation, specific details are set forth in order to provide a thorough understanding of the disclosure. However, it will be apparent that the disclosure may be practiced without these specific details.

Figure 1A:
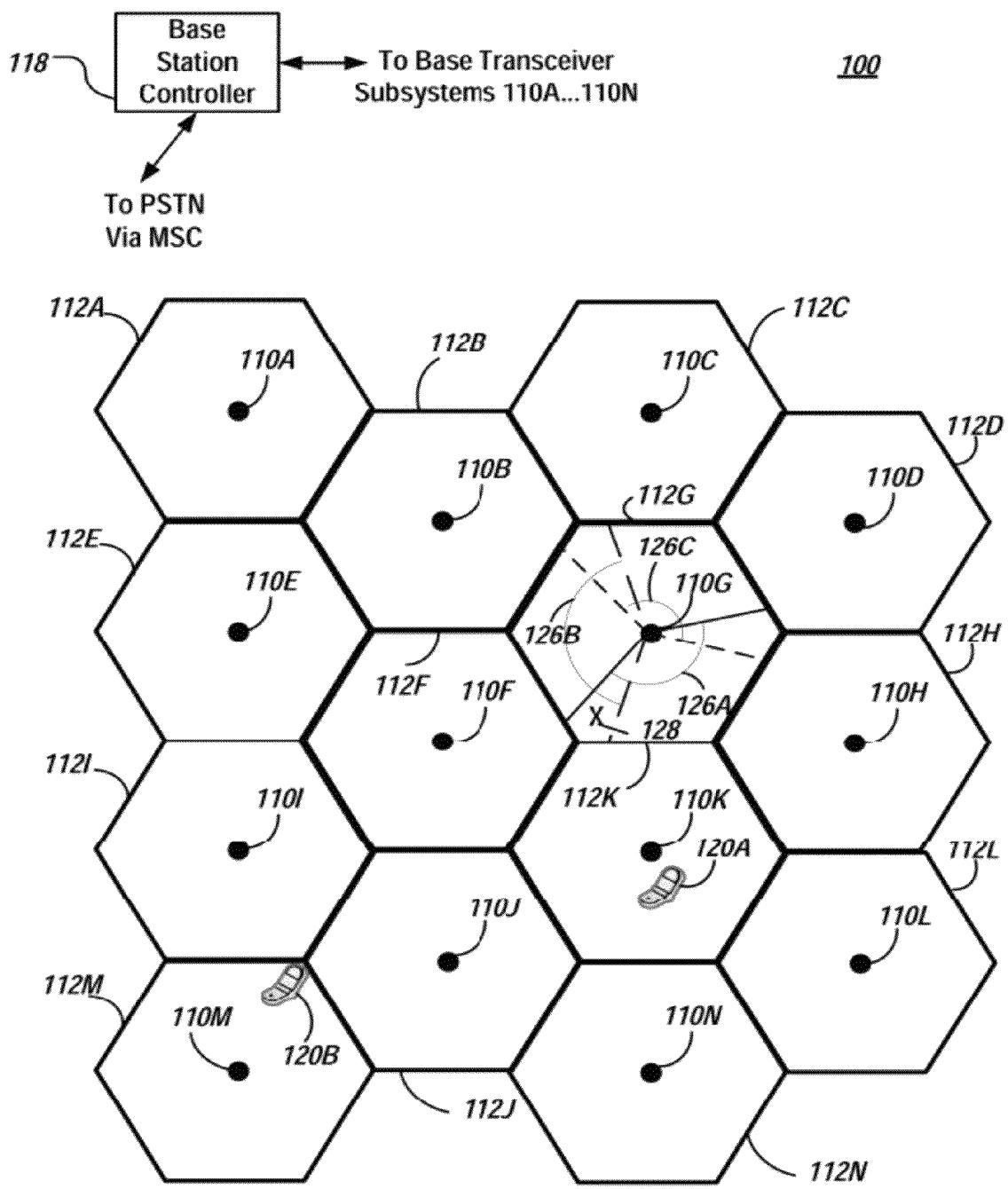
FIG. 1A is a simplified diagram of a wireless communication system, including mobile stations positioned near several base stations having idealized hexagonal coverage areas.
Figure 1B:
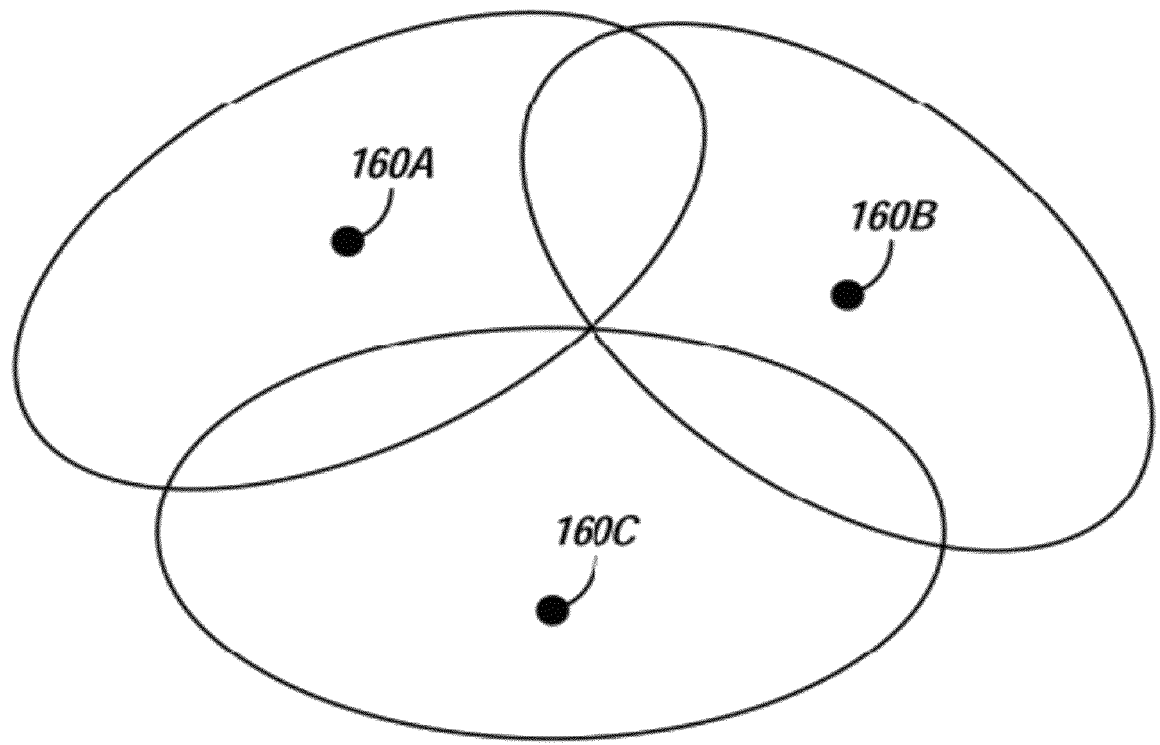
FIG. 1B is an illustration showing several base stations having coverage areas that overlap.

Embodiments provide systems and methods used by mobile stations to process forward link channel signals generated by a CDMA base station. Embodiments also provide systems and methods used by base stations to generate forward link channel signals to be used by mobile stations. In embodiments, forward link channel signals are encoded with orthogonal codes, such as Walsh Codes. Encoded CDMA2000 1x forward link signals of two users are then transmitted using time sharing techniques. Additional embodiments use code-combining soft/softer handoff across sectors in the mobile station active set coupled with time sharing of the given Walsh Code by two users at the same time. In this embodiment, different parts of the packet or frame are transmitted to the user by various base stations in the active set, allowing earlier decoding and therefore packet or frame termination FIG. 1A is an illustration showing a wireless communication system 100 including several base stations 110A-110N having hexagonal coverage areas, or cells 112A-112N, in a symmetrically tiled arrangement where each area abuts another area. The base stations 110A-110N are controlled by a base station controller 118. A mobile station 120A, which is located within the coverage area of base station 110K, is located very close to base station 110K and therefore receives a strong signal from base station 110K and relatively weak signals from surrounding base stations. Similarly, mobile station 120B is located in the coverage area of base station 110M but is close to the coverage area of base stations 110I and 110J. However, since mobile station 120B receives a relatively weak signal from base station 110M and similarly sized signals from base stations 110I and 110J, mobile station 120B might be in soft handoff with base stations 110M, 110I and 110J. Although the illustration in FIG. 1A shows that base station coverage areas are hexagonal with no overlap, base station coverage areas may vary in size and in shape and may tend to overlap with coverage area boundaries defining coverage area shapes different from the illustrated hexagonal shapes. For example, FIG. 1B illustrates three base stations 160A-160C, with overlapping coverage areas.

The base stations 110A-110N are connected and configured for bi-directional communication with the base station controller 118. The base station controller 118 can be hard-wired to the base stations 110A-110N. The base stations 110A-110N have appropriate transmitters and receivers configured to transmit, receive, encode, and decode transmissions between to and from the base stations 110A-110N. The base stations 110A-110N have appropriate transmitters and receivers configured to convey, receive, encode, and decode transmissions. The base station controller 118 is also connected and configured for bi-directional communication with other base station controllers.

Cells may also be sectored, as illustrated in FIG. 1A, which shows that cell 112G containing base station 110G is a three sectored base station. Cells can also be sectored into lesser or greater numbers of sectors. Each sector 126 of cell 112G covers more than 120 degrees of the base station coverage area. Sector 126A, which has a coverage area indicated by the unbroken lines, overlaps the coverage area of sector 126B, which has a coverage area indicated by the coarse dashed lines. Sector 126A also overlaps the sector 126C, which has a coverage area indicated by the fine dashed lines. Location 128, which is identified by the X in FIG. 1A, is located in both the coverage area of sector 126A and the coverage area of sector 126B.

Dividing a cells into sectors reduces the total interference between mobile stations located within the coverage area of the base station while increasing the number of mobile stations that can communicate through the base station. For example, a sector 126C does not transmit a signal intended for a mobile station at location 128 and therefore a mobile station located in sector 126C is not significantly interfered with by the communication of a mobile station at location 128 with base station 110G. However, a mobile station positioned at location 128 receives signals from sectors 126A and 126B and from base stations 110F and 110K. Therefore the interferences at location 128 are from sectors 126A and 126B and from base stations 110F and 110K but not from sector 126C. Further, a mobile station located at location 128 might be in softer handoff, as described below, with sectors 126A and 126B as well as in soft handoff with base stations 110F and 110K. The soft handoff and softer handoff modes can be simultaneous.

Mobile stations, which operate in soft or softer handoff mode, receive data from at least two base stations. For example, a mobile station 120B receives data from base stations 110M, 110I, and 110J. The received data is then combined prior to decoding. In CDMA forward link receiver, the received signals from multiple base stations (in the case of softer/soft handoff) are combined prior to decoding. In CDMA reverse link receiver, the received signal at each base station is decoded independently and the decoded data is forwarded to the base station controller. At the base station controller, the correctly decoded data is selected from any of the successfully decoded data stream (in the case of soft handoff).

Base stations 110A-110N and mobile stations 120A and 120B can communicate using several access schemes that allow multiple users to share a communication medium. Here, for example Code Division Multiple Access (CDMA) is used by the mobile stations 120A and 120B and base stations 110A-110N to share communication mediums. CDMA systems use a common frequency band for communication with all base stations 110A-110N in the system, which allows for simultaneous communication between a mobile station 120A or 120B and more than one base station 110A-110N. CDMA is a form of multiple accesses used by spread-spectrum communication systems. CDMA systems use a wideband spreading signal to convert narrowband data sequences to wideband signals. The spreading signals can include pseudo-noise (PN) sequences as well as orthogonal codes such as Walsh Codes.

PN codes are binary sequences that appear random but can be reproduced by intended receivers or mobile stations. PN codes, which are almost orthogonal, are used in asynchronous CDMA to encode and decode a user's signal. Walsh Codes, which are mathematically orthogonal codes, are used to uniquely define individual communication channels. Walsh codes are uncorrelated. The interfering effect of a code to another can be completed removed at the mobile station receiver is these two codes are transmitted synchronously and do not experience channel variation. In some embodiments a Walsh Code is uniquely assigned to a given mobile station in a given power control group (PCG).

Some CDMA standards require that the base stations 110A-110N implement forward link power control and that the mobile stations 120A and 120B assist with this. Under these standards at least one of the mobile station 120A or 120B commands the base stations 110A-110N to maintain a predetermined signal quality standard. In other words the mobile station 120A or 120B commands the bases stations 110A-110N to adjust their transmit power. The base station increases or decreases its transmitting power on the forward traffic channel assigned to the mobile station to a new power level. The base station maintains the new power level and operates at the new power level for a period of time until it receives a new power level request from the mobile station. The period of time that the new power level is maintained is the duration of one power control group (PCG). Each forward traffic channel frame has duration of 20 milliseconds and consists of sixteen PCGs, each with duration of 1.25 milliseconds.

In the system 100, there is time sharing of an orthogonal code (here a Walsh Code) by two users for a cdma2000 1x forward link. Additionally, there is code-combining soft/softer handoff across sectors in the mobile station active set coupled with time sharing of the given Walsh Code by two users at the same time. Different parts of the packet or frame are transmitted to the user by the base stations in the active set allowing earlier decoding and therefore earlier packet or frame termination than without such time sharing and code combining.

Figure 1C:
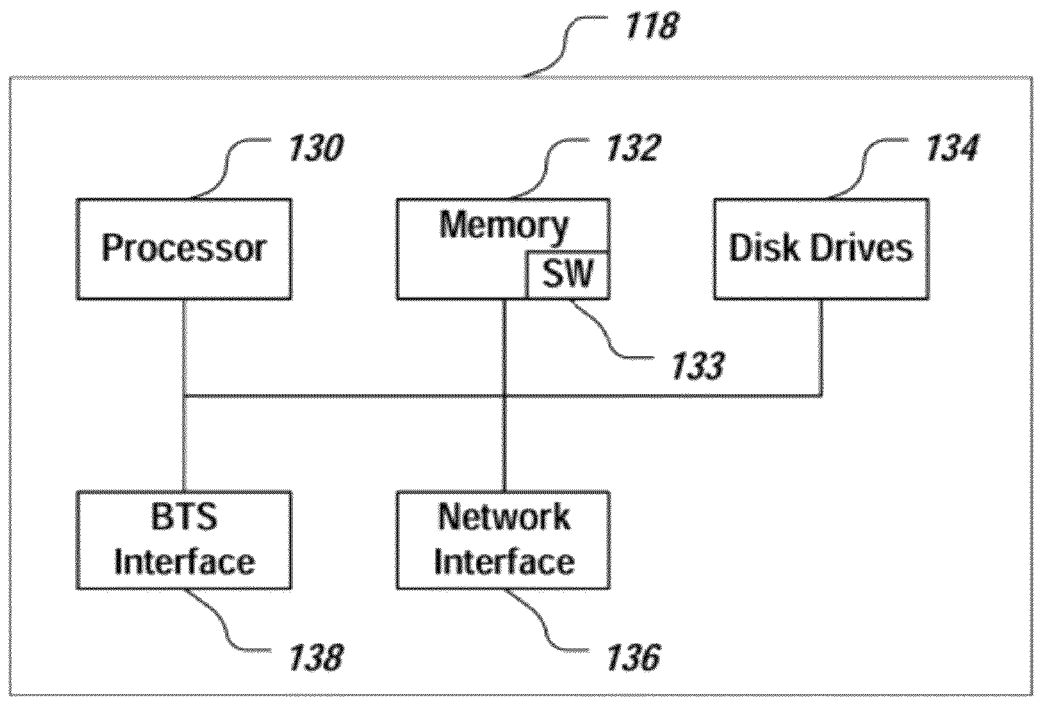
FIG. 1C is a block diagram of components of the base station controller shown in FIG. 1A.

FIG. 1C is block diagram illustrating a base station controller 118 and includes a processor 130, memory 132, disk drives 134, a network interface 136, and a base station interface 138. The base station interface 138 includes the transmitter and receiver for transmitting, receiving, encoding, and decoding transmissions between the base station controller 118 and the base stations 110A-110N. The processor 130 is preferably an intelligent hardware device, e.g., a central processing unit (CPU) such as those made by Intel® Corporation or AMD®, a microcontroller, an application specific integrated circuit (ASIC), etc. The memory 132 includes random access memory (RAM) and read-only memory (ROM). The disk drives 134 include a hard-disk drive and can include floppy-disk drives, a CD-ROM drive, and/or a zip drive. The network interface includes appropriate hardware for bi-directional communication to and from a mobile switch center (MSC) that is in communication with a phone network such as a public-switched telephone network (PSTN).

The base station controller 118 stores, e.g., in the memory 132, computer-readable, computer-executable software code 133 containing instructions that are configured to, when executed, cause the processor 130 to perform functions described below (although the description may read that the software 133 performs the function(s)). Alternatively, the software 133 may not be directly executable by the processor 130 but is configured to cause the computer, e.g., when compiled and executed, to perform the functions. The functions implement mechanisms for improving network performance through adapting network resources to network traffic load. The software 133 can be loaded onto the base station controller 118, e.g., by being downloaded via a network connection, uploaded from a disk, etc.

Figure 1D:
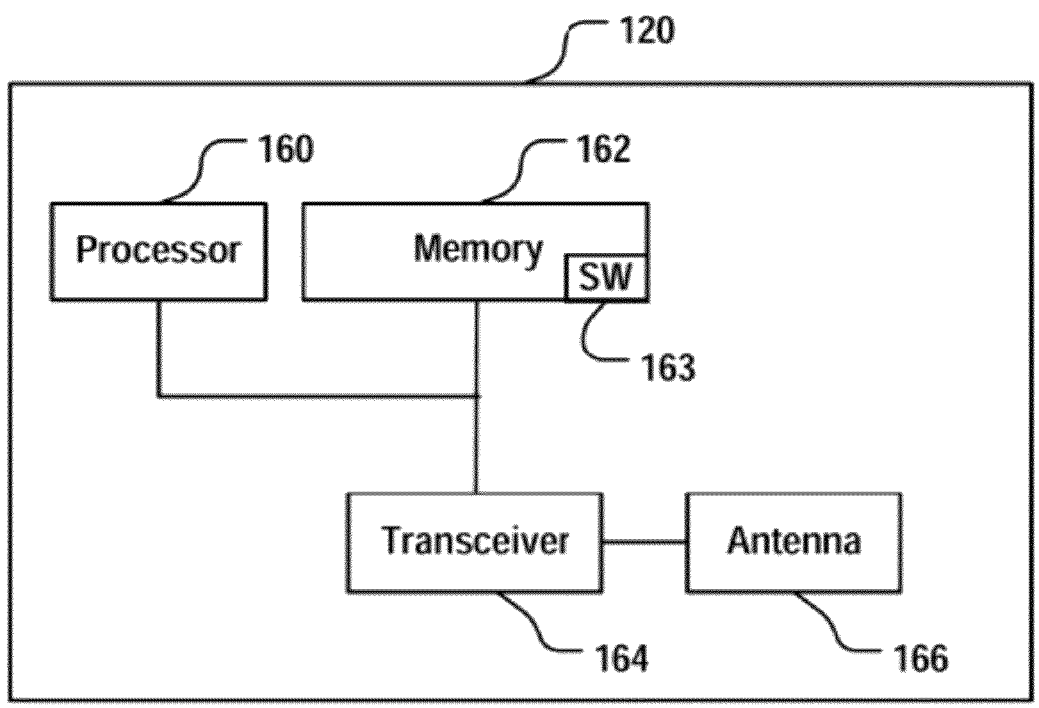
FIG. 1D is a block diagram of components of a mobile station shown in FIG. 1A.

FIG. 1D is block diagram illustrating a mobile station 120 and includes a processor 160, memory 162, a transceiver 164, and an antenna 166. The mobile station (MS) 120 is intended to refer to any of the mobile stations described in this disclosure including but not limited to mobile stations 120A and 120B. The transceiver 164 is configured to communicate bi-directionally with the base stations 110A-110N. The processor 160 is preferably an intelligent hardware device, e.g., a central processing unit (CPU) such as those made by Intel® Corporation or AMD®, a microcontroller, an application specific integrated circuit (ASIC), etc. The memory 162 includes random access memory (RAM) and read-only memory (ROM). The memory 162 stores computer-readable, computer-executable software code 163 containing instructions that are configured to, when executed, cause the processor 160 to perform various functions described herein. Alternatively, the software 163 may not be directly executable by the processor 160 but is configured to cause the computer, e.g., when compiled and executed, to perform the functions.

Figure 1E:
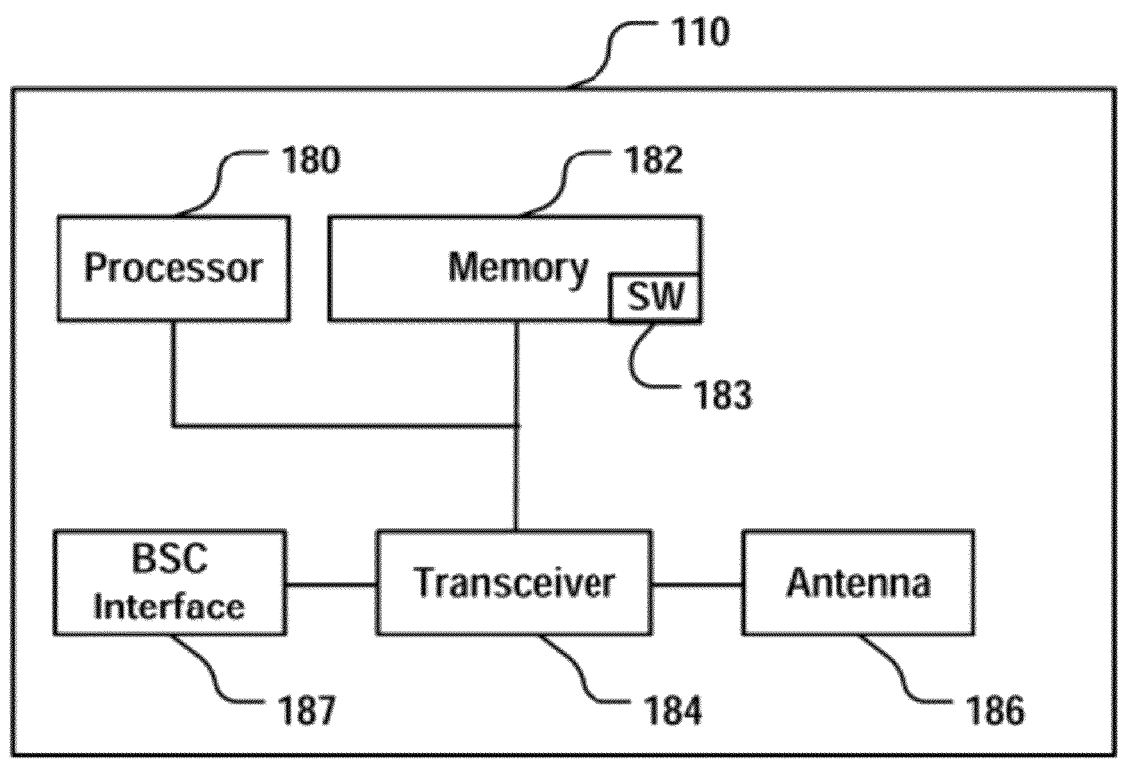
FIG. 1E is a block diagram of components of a base station shown in FIG. 1A.

FIG. 1E is block diagram illustrating one of the base stations 110 and includes a processor 180, memory 182, a transceiver 184, an antenna 186 and a base station controller interface 187. The base station (BS) 110 is intended to refer to any of the base stations described in this disclosure including but not limited to base stations 110A-110N. The transceiver 184 is configured to communicate bi-directionally with the mobile stations 120A-120B. The processor 180 is preferably an intelligent hardware device, e.g., a central processing unit (CPU) such as those made by Intel® Corporation or AMD®, a microcontroller, an application specific integrated circuit (ASIC), etc. The memory 182 includes random access memory (RAM) and read-only memory (ROM). The memory 182 stores computer-readable, computer-executable software code 183 containing instructions that are configured to, when executed, cause the processor 180 to perform various functions described herein. Alternatively, the software 183 may not be directly executable by the processor 180 but is configured to cause the computer, e.g., when compiled and executed, to perform the functions. The base station controller interface 187 includes the transmitter and receiver for transmitting, receiving, encoding, and decoding transmissions between the base station controller 118 and the base stations 110A-110N.

Figures 2A, 2B:
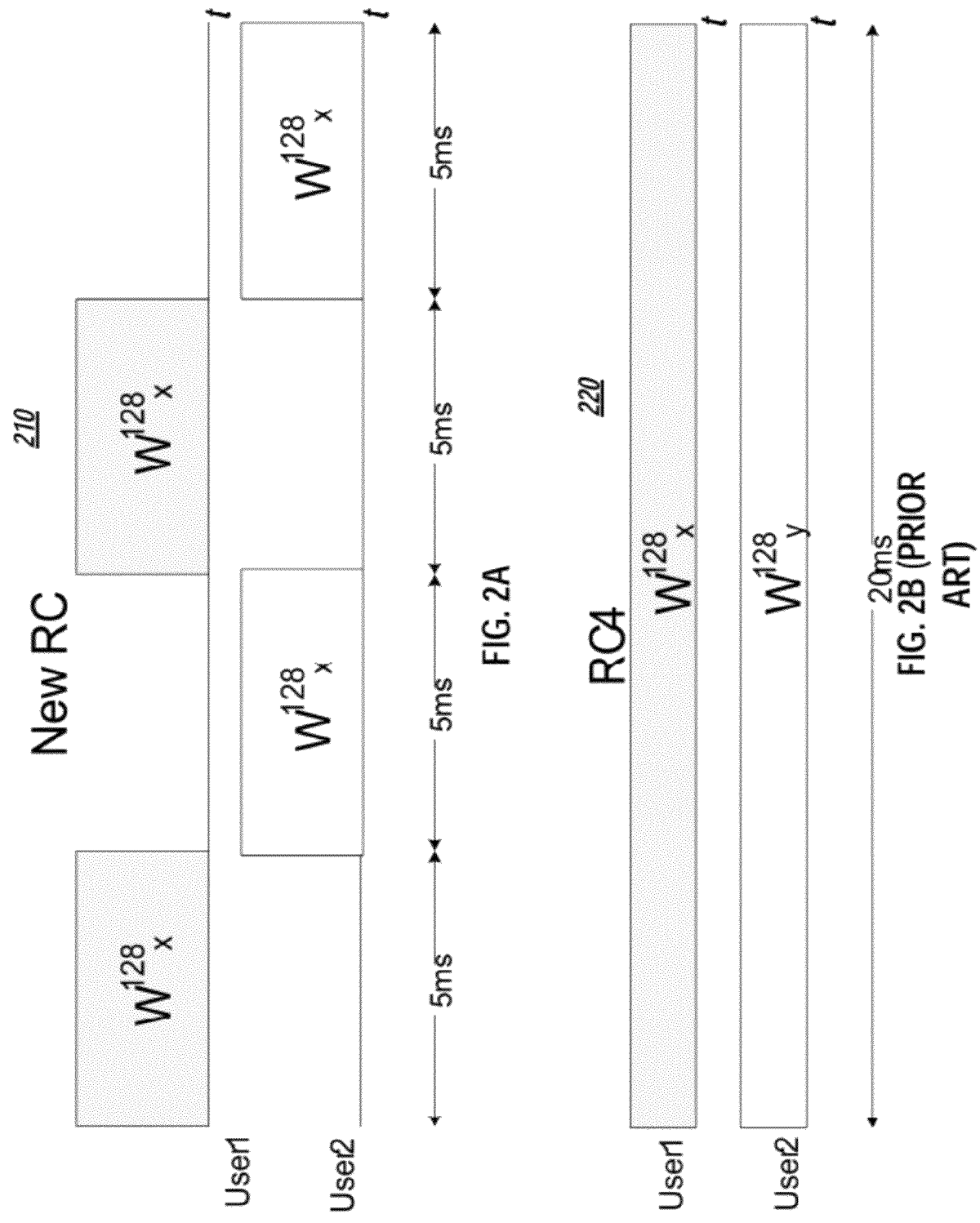
FIG. 2A is an illustration showing Forward Link Fractional Time Transmission.
FIG. 2B is an illustration showing a prior art transmission.

FIG. 2A is an illustration showing Forward Link Fractional Time Transmission using a new radio configuration (New RC) 210, in accordance with an embodiment. With the new RC 210, only one Walsh Code, which is depicted as $W^{128}{}_x$, is used. The 20 millisecond time duration is divided so that 10 milliseconds are used for a first user (User 1) and 10 milliseconds are used for the second user (User 2). The new RC 210 has a power control group structure of 4-PCG ON, 4-PCG OFF, 4-PCG ON, 4-PCG OFF, with each having equal time duration of 5 milliseconds. Since each PCG is 1.25 milliseconds (i.e. 16 PCGs per 20 milliseconds), in the new RC 210, during the first 5 milliseconds: the PCG for User 1 is ON and the PCG for User 2 is OFF, during the second 5 milliseconds the PCG for User 1 is OFF and the PCG for User 2 is ON, during the third 5 milliseconds the PCG for User 1 is ON and the PCG for User 2 is OFF, and during the fourth 5 milliseconds the PCG for User 1 is OFF and the PCG for User 2 is ON. Other power control structures may be used, e.g., 8-PCG ON, 8-PCG OFF, with each having an equal time duration of 10 milliseconds, or 2-PCG ON, 2-PCG OFF and so on, with each having an equal time duration of 2.5 milliseconds. As is described below with reference to FIG. 4A, early termination of User1's packet can happen anywhere in the middle transmission provided User 1 receives the information it needs.

FIG. 2B is an illustration showing a prior art transmission, depicted as radio configuration 4 (RC4) 220, used for comparison with the New RC 210. With RC4 220, two Walsh Codes, which are depicted as $W^{128}{}_x$ and $W^{128}{}_y$, are used. The 20 millisecond time duration is chosen so that 20 milliseconds is used for the first user (User 1) and 20 milliseconds are used for the second user (User 2). The two users occupy the same 20 milliseconds because the signals have been orthogonalized using the two Walsh Codes $W^{128}{}_x$ and $W^{128}{}_y$ and are therefore distinguishable even if they overlap the same time domain. A comparison of FIGS. 2A and 2B shows that using the New RC 210, twice as many users are possible given the same number of Walsh Codes and the same time frame, by allowing transmissions for two users in the same 20 millisecond time domain and only using one Walsh Code.

FIGS. 3A and 3B illustrate two alternatives Forward Link Fractional Transmission Patterns 310 and 320, in accordance with embodiments. The power control pattern 310 has a structure with segments of 2-PCG ON, 2-PCG OFF, with each segment having equal time duration of 2.5 milliseconds. The power control pattern 320 has a structure with segments of 1-PCG ON, 1-PCG OFF, with each segment having equal time duration of 1.25 milliseconds. As with the forward link fractional transmission pattern illustrated in FIG. 2A, twice as many users are possible than in the prior art, given the same number of Walsh Codes and the same time frame. The Forward Link Fractional Transmission Patterns 310 and 320 allow transmissions for two users in the same 20 millisecond time domain and only using one Walsh Code.

Figure 4A:
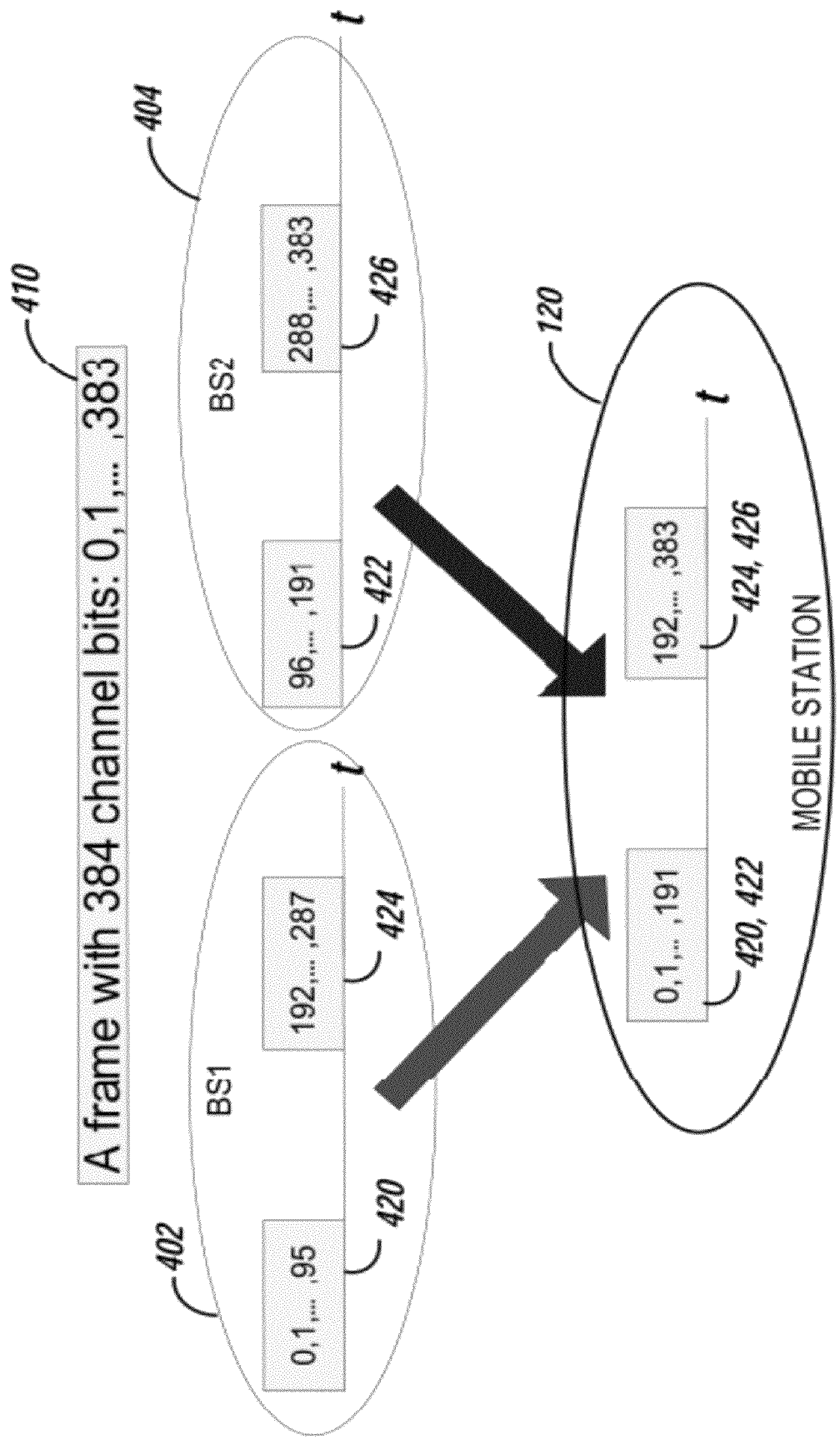
FIG. 4A is a block diagram illustrating transmissions from two base stations to a single mobile station in an active set.

FIG. 4A is a block diagram illustrating transmissions from two base stations 402 and 404 in an active set in order to achieve improved coding gain, in accordance with embodiments. A frame 410 having 384 channel bits (0, 1, ..., 383) is first divided using time domain multiplexing into components which are distributed between a first base station (BS1) 402 and a second base station (BS2) 404. The frame is time domain multiplexed into a first component 420 with bits 0, 1, ..., 95, a second component 422 with bits 96, ..., 191, a third component 424 with bits 192, ..., 287, and a fourth component 426 with bits 288, ..., 383. The BS1 402 is assigned components 420 and 424 with channel bits 0, 1, ..., 95 and 192, ..., 287 whereas the BS2 404 is assigned components 422 and 426 with channel bits 96, ..., 191 and 288, ..., 383. The frame 410 includes data or information that is needed to form a complete message as well as other information that is redundant and used for other purposes such as to increase reliability. In one instance, the first component 420 and the second component 422 provide enough information to form a complete message. The third component 424 and the fourth component 426 contains redundant data used to improve reliability. In this instance, if a mobile station receives channel bits 0, 1, ..., 191 then the mobile station can form a complete message.

The base stations 402 and 404 use transmission patterns that are based on their numbering (odd or even) in the Pilot Strength Measurement Message (PSMM) reported by the mobile station (MS) 120. Because of different transmission patterns, the MS 120 receives information from the two BSs 402 and 404 at the same time. By receiving different portions of the frame 410 at the same time from two different base stations 402 and 404, the mobile station can receive twice as much information in the same amount of time enabling possible early decoding and therefore early termination of sending the frame. Early termination of a packet can happen anywhere in the middle of the first component 420 and anywhere in the middle of the third component 424. For example, FIG. 4A illustrates that the MS 120 first receives channel bits 0, 1, ..., 191, which are the first and second components, and then channel bits 192, ..., 383, which are the third and fourth components. The MS can begin decoding before it receives all the channel bits 0, 1, ..., 383. The MS can determine if all the necessary frame information has been received in channel bits 0, 1, ..., 191 and terminate the transmission of frame data if all of the information has been received. In some situations, only the first channel bits contain a complete message and the remaining bits in a frame are used to transmit redundant data that is not needed. For example, if a complete message is contained in bits 0, 1, ..., 191, and the mobile station 120 receives all 0, 1, ..., 191 bits then there is no need to transmit the last channel bits 192, ..., 383, which are redundant, and the mobile station 120 can request the base stations 402 and 404 for early termination of the transmission of frame 410. This improves the efficiency of communication system 100 because the system 100 can move on to transmitting other bits from other frames instead of wasting time transmitting bits 192, ..., 383 of this frame when they are not needed.

Before a message is transmitted by the base stations 402 and 404, the base station controller 118 divides or time domain multiplexes the message into several components. These components are then encoded with a spreading code, such as a Walsh Code, and organized into sizes that can be transmitted in 10 millisecond blocks. The base station controller 118 also divides, or time domain multiplexes, a second message into several components, encodes those components with the same spreading code, and organizes the components into sizes that can be transmitted in 10 millisecond blocks. The 10 millisecond blocks from the first message and the second message are then combined to form 20 millisecond blocks which each contain one 10 millisecond block from the first message and one 10 millisecond block from the second message. The 10 millisecond blocks can be combined by placing one block after the other or by interleaving the data. These 20 millisecond blocks are then sent to two of the base stations 110A-110N, which transmits the blocks.

Since the two base stations are synchronized, the two base stations transmit blocks simultaneously. A mobile station then receives two 20 millisecond blocks from two base stations simultaneously. Since each mobile station is only interested in one message, each mobile station only decodes one of the two 10 millisecond blocks pulled from the 20 millisecond block. The first message can contain significant amounts of redundant data that is only used in the event that the message is not received. This redundant data is not needed by the mobile station to form a complete message provided the non-redundant data is received by the mobile station. Therefore, if a mobile station 120 receives enough information, which is not redundant information quickly, then the mobile station 120 may obtain the complete message very quickly. Further, if the mobile station 120 receives all the data needed to form a complete message, then the mobile station 120 may request early termination of redundant data because it is not needed. For example, if the mobile station receives a first 10 millisecond block of data from a first base station and a second 10 millisecond block of data from a second base station and both of these blocks contain enough data to form a complete message then the mobile station 120 can send a signal to the base stations 402 and 404 indicating that it has received the complete message and can terminate early, the transmission of the redundant data for the message. Early termination of redundant data can happen anywhere in the middle of transmission.

In one instance, the channel bits 0, 1, . . . , 191, which are the first component 420 and second component 422, can be combined to form a complete message. Once the mobile station receives channel bits 0, 1, . . . , 191, the mobile station 120 can determine if it has enough information. If the mobile station 120 does have enough information then the mobile station 120 can signal the base stations 402 and 404 to terminate transmission of this message. The mobile station 120, which receives channel bits 0, 1, . . . , 95 from the first base station 402 and receives channel bits 96, . . . , 191 from the second base station 404 can be in soft/softer handoff mode with both the first base station 402 and the second base station 404. Since the mobile station 120 has more than one base station (402 and 404) in its active set and receives signals from those base stations (420 and 404) the mobile station is in soft/softer handoff mode. Similarly, channel bits 192, . . . , 383, which are the third component 424 and the fourth component 426, can be combined to form the redundant part of the complete message. The third component 422 and the fourth component 426 are transmitted by stations 402 and 404 respectively during a later 20 millisecond duration after the first component 420 and second component 422 were transmitted. After the mobile station 120 receives channel bits 0, 1, . . . , 191 (420 and 422) during the first 20 millisecond time duration, the mobile station can decide if channel bits 192, . . . , 383 are needed. If these channel bits are not needed, then the mobile station 120 can request that channel bits 192, . . . , 383 not be sent in a later 20 millisecond duration, so that resources are not wasted.

Figure 4B:
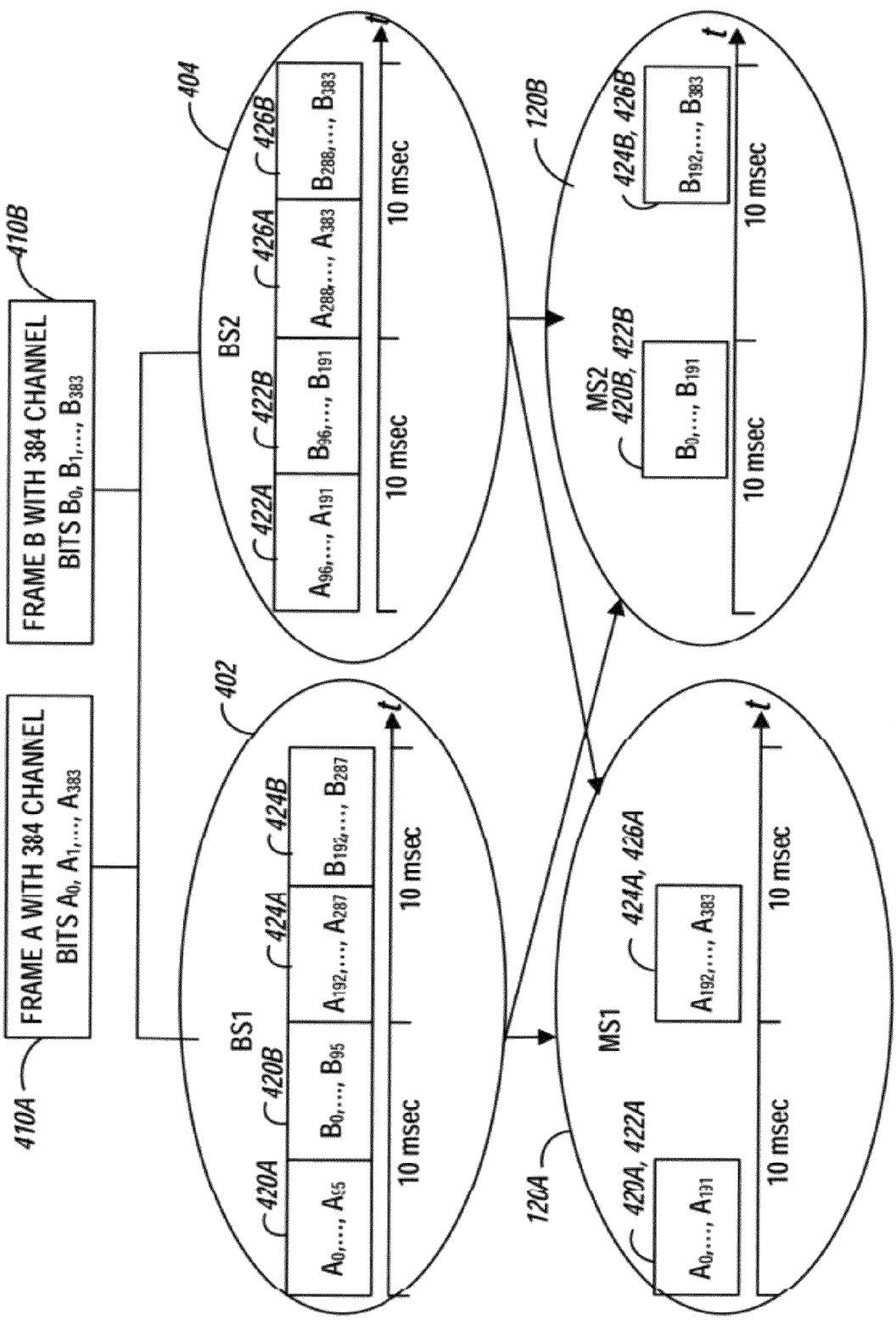
FIG. 4B is a block diagram illustrating transmissions from two base stations to two mobile stations in an active set.

A second message can also be combined with the first message so that portions of each message are transmitted by the two base stations 402 and 404 during the same 20 millisecond duration, as illustrated in FIG. 4B. The 20 millisecond duration can be divided so that 10 milliseconds are used for the first message and 10 milliseconds are used for the second message. For example, if data for a second message were combined with data from frame 410 for a first message then the first base station would transmit the first component 420 and a portion of the second message during the first 20 millisecond duration. The 20 millisecond transmission can include a 10 millisecond block of data from the first message and a 10 millisecond block of data for the second message which are then combined to form the 20 millisecond block of data. The 10 millisecond blocks of data can be combined by placing one block of data after the other or by interleaving the data. The two messages can be intended for two users so that User 1 is the intended recipient of first message and User 2 is the intended recipient of the second message. In this instance, a first mobile station and a second mobile station each receive a 10 millisecond block of data from the two base stations 402 and 404. Both mobile stations combine the data from each of the base stations and determine if they have received their respective complete messages. If either one of the mobile stations determines that it has received a complete message and does not need to receive any more data then, that mobile station sends a signal to the base stations indicating that the base station can stop transmitting the data needed for its message. The base station can stop transmitting the data at any point once the base station has received a signal instructing it to stop transmitting data.

FIG. 4B is a block diagram illustrating transmissions from two base stations 402 and 404 to two mobiles stations 120A and 120B. Frames 410A and 410B, each having 384 channel bits ($A_0, A_1, \ldots, A_{383}$) and ($B_0, B_1, \ldots, B_{383}$), respectively are first divided using time domain multiplexing into components which are distributed between the first base station (BS1) 402 and the second base station (BS2) 404. The frames are time domain multiplexed into a first components 420A and 420B with bits ($A_0, A_1, \ldots, A_{95}$) and ($B_0, B_1, \ldots, B_{95}$), respectively, second components 422A and 422B with bits ($A_{96}, \ldots, A_{191}$) and ($B_{96}, \ldots, B_{191}$), respectively, third components 424A and 424B with bits ($A_{192}, \ldots, A_{287}$) and ($B_{192}, \ldots, B_{287}$), respectively, and fourth components 426A and 426B with bits ($A_{288}, \ldots, A_{383}$) and ($B_{288}, \ldots, B_{383}$), respectively. The BS1 402 is assigned components 420A, 420B, 424A and 424B whereas the BS2 404 is assigned components 422A, 422B, 426A and 426B. The frames 410A and 410B each includes data or information that is needed to form a complete individual message as well as other information that is redundant and used for other purposes such as to increase reliability. In one instance, the first component 420A and the second component 422A provide enough information to form a complete first message and the first component 420B and the second component 422B provide enough information to form a complete second message. Components 424A, 424B, 426A, 426B contain redundant data used to improve reliability. In this instance, if the first mobile station 120A receives components 420A and 422A then the first mobile station 120A can form a complete first message. Similarly, if the second mobile station 120B receives components 420B and 422B then the second mobile station 120B can form a complete second message. If either one of the mobile stations 120 or 120B determines that it has received a complete message and does not need to receive any more data then, that mobile station 120A or 120B sends a signal to the base stations 402 and 404 indicating that the base station 402 and 404 can stop transmitting the data needed for its message. The base station can stop transmitting the data at any point once the base station has received a signal instructing it to stop transmitting data. Since both mobile station 120A and 120B have more than one base station (402 and 404) in their active sets and both receive signals from those base stations (420 and 404) the mobile stations 120A and 120B are both in soft/softer handoff mode.

Figure 5:
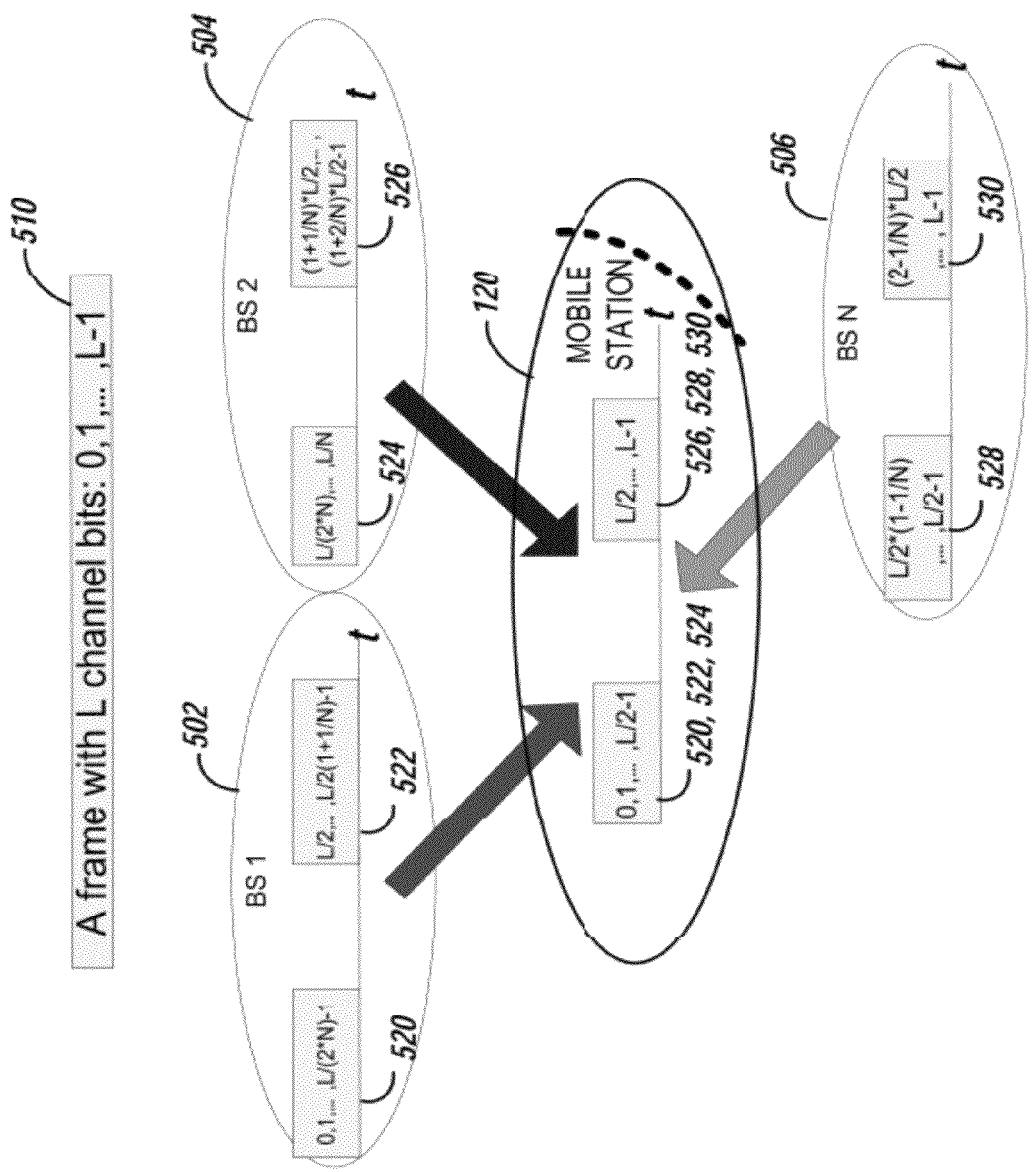
FIG. 5 is a block diagram illustrating generalized transmissions from N base stations in an active set.

FIG. 5 is a block diagram illustrating generalized transmissions from N base stations 502, 504, . . . , 506 in an active set in order to achieve improved coding gain. A frame 510 having L channel bits (0, 1, . . . , L−1) is first divided using time domain multiplexing into components which are distributed between N base stations identified as a first base station (BS1)

502, a second base station (BS2) 504 through an N base station (BSN) 506. The frame 510 is time domain multiplexed into a first component 520 with bits 0, 1, ..., L/(2*N)–1, a second component 522 with bits L/2, ..., L/2(1+1/N)–1, a third component 524 with bits L/(2*N), ..., L/N, a fourth component 526 with bits (1+1/N)*L/2, ..., (1+2/N)*L/2–1, a (2N–1)th component 528 with bits L/2*(1–1/N), ..., L/2–1, and a 2Nth component 530 with bits (2–1/N)*L/2, ..., L–1. The N transmission patterns can be defined with each one assigned to one of the base stations 502, 504, ..., 506 in the active set. FIG. 5 illustrates an example where L is divisible by 2*N.

In FIG. 5, BS1 502 is assigned the first component 520 with bits 0, 1, ..., L/(2*N)–1 and the second component 522 with bits L/2, ..., L/2(1+1/N)–1, BS2 504 is assigned the third component 524 with bits L/(2*N), ..., L/N and the fourth component 526 with bits (1+1/N)*L/2, ..., (1+2/N)*L/2–1, and BSN 506 is the (2N–1)th component 528 with bits L/2*(1–1/N), ..., L/2–1 and the 2Nth component 530 with bits (2–1/N)*L/2, ..., L–1. The Sectors use transmission patterns that are based on their numbering (odd or even) in the PSMM reported by the mobile station MS 120. Because of different transmission patterns, the MS 120 receives additional information from the N base stations 502, 504, 506 at the same time enabling possible early decoding and therefore early termination of the packet or frame. Early termination of a packet can happen anywhere in the middle of the transmission of the packet provided enough information has been received that more information is not needed. For example, FIG. 5 illustrates that the MS 120 first receives channel bits 0, 1, ..., L/2–1, which is the first component, and then channel bits L/2, ..., L–1, which is a later component. Since the MS 120 can begin decoding as soon as it receives channel bits 0, 1, ..., L/2–1, the MS 120 can determine if all the frame information needed to form a complete message has been received in channel bits 0, 1, ..., L/2–1 and terminate the transmission of the frame data if all of the information for a complete message has been received. The fraction of transmission can scale down with N increases, so that more channel code reuse can be achieved. If fraction is kept at ½, more coding gain can be achieve, which leads to more early decoding of the frames. In another embodiment, if the active set size is one, then full frame transitions instead of fractional transmissions are used.

Figure 6:
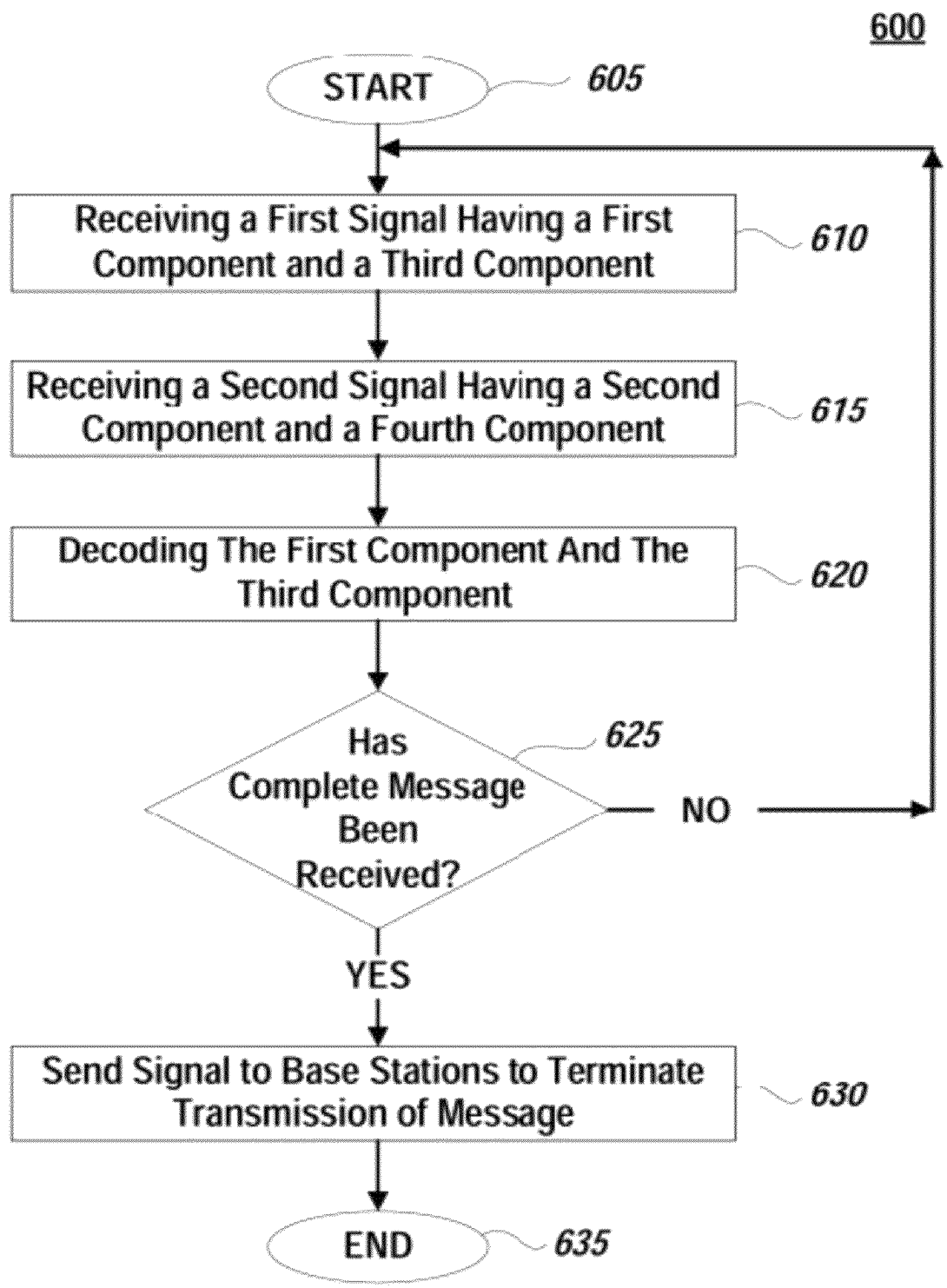
FIG. 6 is a flowchart illustrating operations used by a mobile station to process forward link channel signals generated by a CDMA base station.

FIG. 6 is a flowchart illustrating a process 600 used by a mobile station 120 to process forward link channel signals generated by at least one of the CDMA base stations 402 and 404. The process 600 begins in operation 605 with the mobile station 120 set up to receive incoming signals or packets from two base stations 402 and 404. In operation 610, the mobile station 120 receives a first signal transmitted by a first base station 402. The first signal has a first component 420 and a third component 424. Both the first component 420 and the third component 424 have been coded using a spreading code. The first component 420 is time domain multiplexed with the third component 424. Next in operation 615, the mobile station 120 receives a second signal transmitted by a second base station 404. The second signal has a second component 422 and a fourth component 426. Both the second component 424 and the fourth component 426 have also been coded using the spreading code. The second component 422 is time domain multiplexed with the fourth component 426. In operation 620, the mobile station 120 decodes the first component 420 and the second component 422. The first component 420 can be different than the second component 422 and the third component 424 can be different than the fourth component 426. The first component 420 and the second component 422 can be combined to form a complete message. Next in operation 625, a decision is made whether a complete message has been received by the mobile station 120. If the decision is that a complete message has been received by the mobile station 120, then in operation 630, the mobile station 120 sends a signal to the base stations 402 and 404 to stop transmitting the message, because it has already been received. If the decision in operation 625 is that a complete message has not been received, then the process 600 continues back to operation 610. The process 600 ends in operation 635 when a complete message has been received and the mobile station 120 is ready to receive another message.

Figure 7:
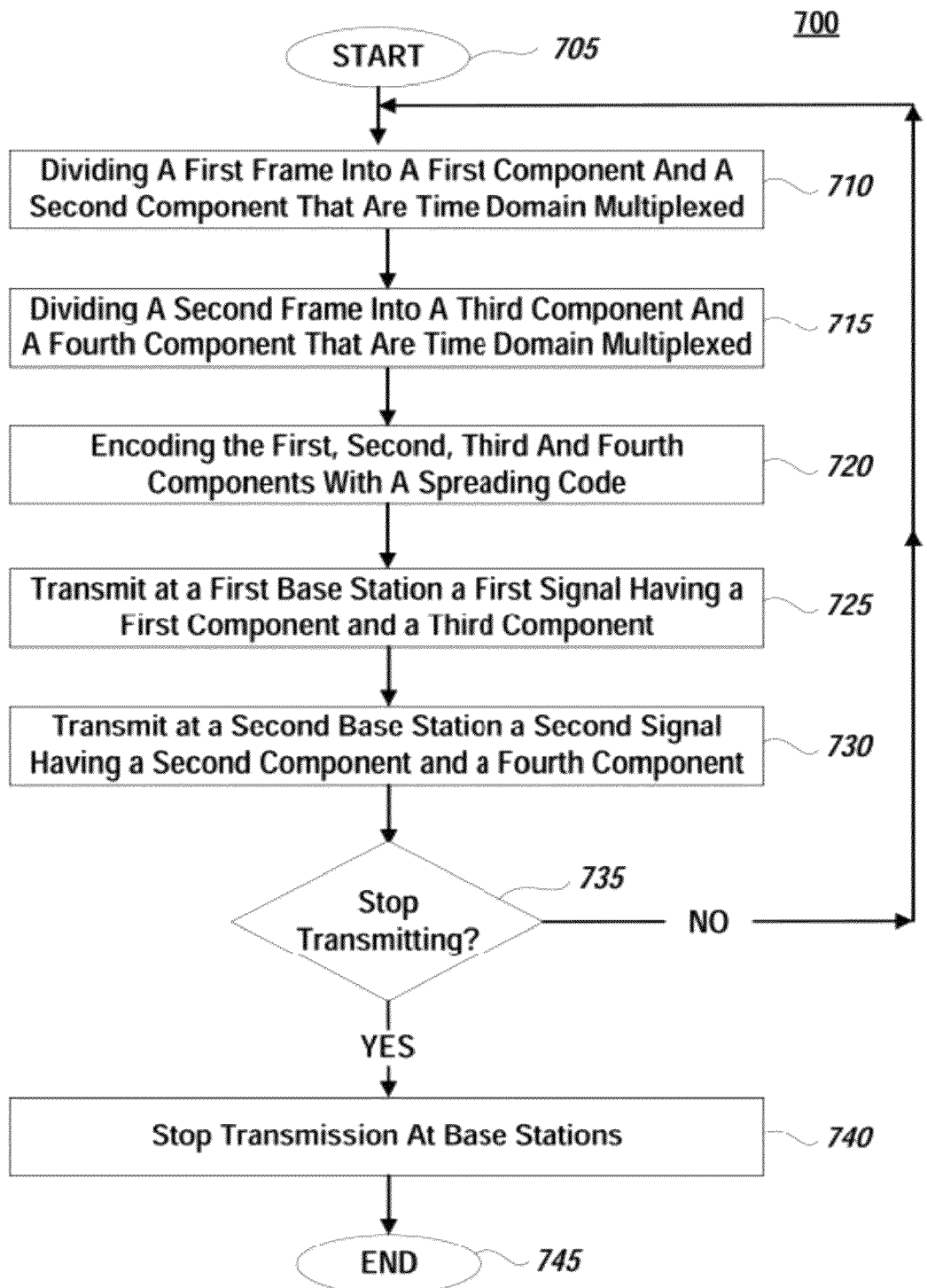
FIG. 7 is a flowchart illustrating operations used by base stations to generate forward link channel signals.

FIG. 7 is a flowchart illustrating process 700 used by base stations 402 and 404 to generate forward link channel signals. The process begins in operation 705 when the base stations 402 and 404 are initialized and ready to break up a packet or frame into components by time domain multiplexing the components of the packet or frame. In operation 710, a first frame is divided into components which can include a first component and a second component, which are time domain multiplexed. In operation 715, a second frame is divided into components including a third component and a fourth component, which can be time domain multiplexed. Next in operation 720, the first component, the second component, the third component and the fourth component are also encoded with spreading code. In operation 725, the first base station 402 transmits a first signal, which includes a first component 420 and a third component 424 that each have been coded using the spreading code. The first component 420 is time domain multiplexed with the third component 424. In operation 730, the second base station 404 transmits a second signal, which includes a second component 422 and a fourth component 426 that each have been coded using the same spreading code. The second component 422 is time domain multiplexed with the fourth component 426. Next in operation 735, a decision is made whether the base stations 402 and 404 have received a message from the mobile station 120 indicating that the message received is a complete message and to stop transmitting the data for the frame. If the decision is that a message to stop transmitting has been received by the base stations 402 and 404, then in operation 740, the base stations 402 and 404 stop transmitting the message. The base station can stop transmitting the data at any point once the base station has received the signal instructing it to stop transmitting data. Early termination of a packet can happen anywhere in the middle of the first component 420 and anywhere in the middle of the third component 424. If the decision in operation 735 is that a message to stop transmitting has not been received, then the process 700 continues back to operation 725. The process 700 ends in operation 745 when the transmission has stopped and the base stations 402 and 404 await transmission o another signal or message.

Figure 8:
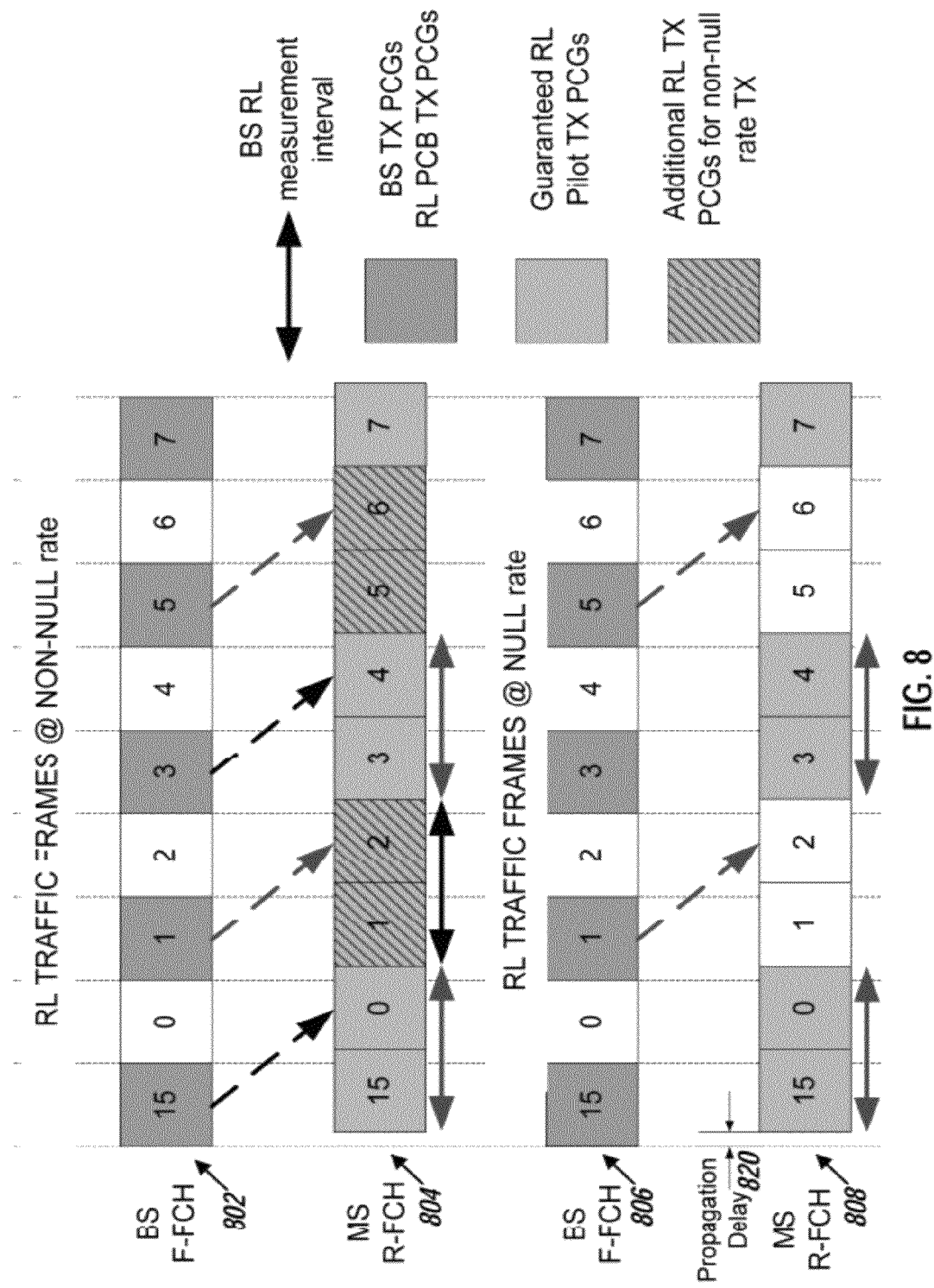
FIG. 8 is a block diagram illustrating an approach for Reverse Link Power Control.

FIG. 8 is a block diagram illustrating reverse link power control used on the CDMA2000 and WCDMA downlinks with four frames 802, 804, 806, and 808. Frames 802 and 806 depict the transmission downlink of a base station 110 to a mobile station 120. Frames 804 and 808 depict the transmission uplink from a mobile station 120 to a base station 110. Frames 802 and 806 illustrate frames of power control groups (PCGs) transmitted from the BS 110 to the MS 120 using a forward fundamental channel (F-FCH) whereas frames 804 and 808 illustrate frames of PCGs transmitted from the MS 120 to the BS 110 using a reverse fundamental channel (R-FCH). The PCGs can include power control commands that command the intended recipient of the power control command to change its transmission power. Frames 804 and 808 are offset in time from frames 802 and 806, respectively by a propagation delay 820. The fundamental channel is the physical channel used to carry voice signals. In frames 802 and 806, the BS 110 transmits power control commands, which are part of the PCG, to the MS 120 commanding the MS 120 to change the mobile station's transmission power by a predetermined amount. The power control commands transmitted by the BS 110 can be used to ensure that the BS 110 receives signals from the MS 120 having a minimum power level (i.e. a minimum quality), while at the same time, minimizing the power usage of the MS 120.

Frames 802 and 804 illustrate the transmission of a power control command from a BS 110 to a MS 120 at non-null rates. Frames 802 and 804, which are both 20 millisecond frames, each include 16 PCGs that are 1.25 milliseconds long and are identified as PCG 0, 1, 2, . . . , 15. A power control command, which is part of PCG 15 in frame 802, is transmitted by the BS 110 to the MS 120, which receives the power control command in PCG 0 of frame 804. The mobile station 120 then adjusts its transmission power according to the power control command so that the mobile station's transmission power of the next power control group (PCG 1) of frame 804 is adjusted in accordance with the received power control command. For example, the power control command from PCG 15 might instruct the mobile station 120 to increase its power output by one decibel if the signal received by the BS 110 is too low. Alternatively, the power control command from PCG 15 could instruct the MS 120 to decrease its power output by one decibel if the signal received by the BS 110 is too high. The BS 110 also transmits power control commands from PCGs 1, 3, and 5 of frame 802 to mobile station's PCGs 2, 4, and 6 of frame 804, respectively. Although not shown in the illustration, the BS 110 also transmits power control commands from PCGs 7, 9, 11 and 13 of frame 802 to the mobile stations PCGs 8, 10, 12 and 14 of frame 804. When the MS 120 receives the power control command at PCGs 2, 4, and 6 from frame 804, the MS 120 adjusts its transmitted power in PCG 3, 5 and 7 of frame 804. For example, when the MS 120 receives a power control command in PCG 0 of frame 804, the MS 120 adjusts its transmitted power for PCGs 1 and 2 of frame 804, according to the power control command received from the BS 110 in PCG 15 of frame 802. When the MS 120 receives a power control command in PCG 2 of frame 804, the MS 120 adjusts its transmitted power for PCGs 3 and 4 of frame 804, according to the power control command received from the BS 110 in PCG 1 of frame 802. When the MS 120 receives a power control command in PCG 4 of frame 804, the MS 120 adjusts its transmitted power for PCGs 5 and 6 of frame 804, according to the power control command received from the BS 110 in PCG 3 of frame 802. When the MS 120 receives a power control command in PCG 6 of frame 804, the MS 120 adjusts its transmitted power for PCGs 7 and 8 of frame 804, according to the power control command received from the BS 110 in PCG 5 of frame 802.

Frames 802 and 804 show that power control commands are transmitted from the BS 110 to the MS 120 eight times during the 20 millisecond frame. Frame 802 also illustrates an interlaced PCG structure where the odd numbered PCGs 1, 3, 5, . . . , 15 are shaded and the even numbered PCGs 0, 2, 4, . . . , 14 are not shaded. The interlaced PCG structure can be used to transmit power control commands from a BS 110 to two or multiple mobile stations 120A or 120B. For example, the odd numbered PCGs 1, 3, 5, . . . , 15 can be used to transmit power control commands as well as other information to a first mobile station 120A, whereas the even numbers PCGs 0, 2, 4, . . . , 14 can be used to transmit power control commands as well as other commands to a second mobile station 120B. The signals transmitted on the odd and even numbered PCG's can share the same Walsh Codes, as described above with reference to FIGS. 2-7.

Frames 806 and 808 illustrate the transmission of a power control command from a BS 110 to a MS 120 at null rates. Frames 806 and 808, which are both 20 millisecond frames, each include 16 PCGs that are 1.25 milliseconds long and are identified as 0, 1, 2, . . . , 15. A power control command which is part of PCG 1 from frame 806 is transmitted by the BS 110 to the MS 120, which receives the power control command in PCG 2 of frame 808. The mobile station 120 then adjusts its transmission power according to the power control command so that the mobile station's 120 transmission power of the next power control group (PCG 3) of frame 808 is adjusted in accordance with the received power control command. For example, the power control command from PCG 1 might instruct the mobile station 120 to increase its power output by one decibel if the signal received by the BS 110 is too low. Alternatively, the power control command from PCG 1 could instruct the MS 120 to decrease its power output by one decibel if the signal received by the BS 110 is too high. The BS 110 also transmits power a control command from PCG 5 of frame 806 to the mobile station's PCG 6 of frame 808. Although not shown in the illustration, the BS 110 also transmits power control commands from PCGs 9 and 13 of frame 806 to the mobile station's 120 PCGs 10 and 14 of frame 808. When the MS 120 receives the power control command at PCGs 2 and 6 of frame 808, the MS 120 adjusts its transmitted power in PCG 3 and 7 of frame 808, respectively. For example, when the MS 120 receives a power control command in PCG 2 of frame 808, the MS 120 adjusts its transmitted power for PCGs 3, 4, 5, and 6 of frame 808 according to the power control command received from the BS 110 in PCG 1 of frame 806. In certain instances, the MS 120 may be configured to only transmit at half duty cycle when there is little or no information to transmit. In this case, half of the PCGs would not transmit power at all. Frame 808 illustrates a half duty cycle transmission. In frame 808, the shaded PCGs 15, 0, 3, 4, 7, 8, 11, and 12 transmit power whereas the non-shaded PCGs 1, 2, 5, 6, 9, 10, 13, and 14 do not transmit power. In this example, when the MS 120 receives a power control command in PCG 2 of frame 808, the MS 120 adjusts its transmitted power for PCGs 3 and 4 of frame 808 but does not do anything with PCGs 5 and 6 since there is no power transmitted in PCGs 5 and 6.

Frames 806 and 808 show that power control commands are transmitted from the BS 110 to the MS 120 four times during the 20 millisecond frame. As with frame 802, frame 806 also illustrates an interlaced PCG structure where the odd numbered PCGs 1, 3, 5, . . . , 15 are shaded and the even numbered PCGs 0, 2, 4, . . . , 14 are not shaded. The interlaced PCG structure can be used to transmit power control commands as well as other information from a BS 110 to two or multiple mobile stations 120A-120B. Further, as will frame 802, the signals transmitted on the odd and even numbered PCG's in frame 806, can share the same Walsh Codes, as described above with reference to FIGS. 2-7.

Figure 9:
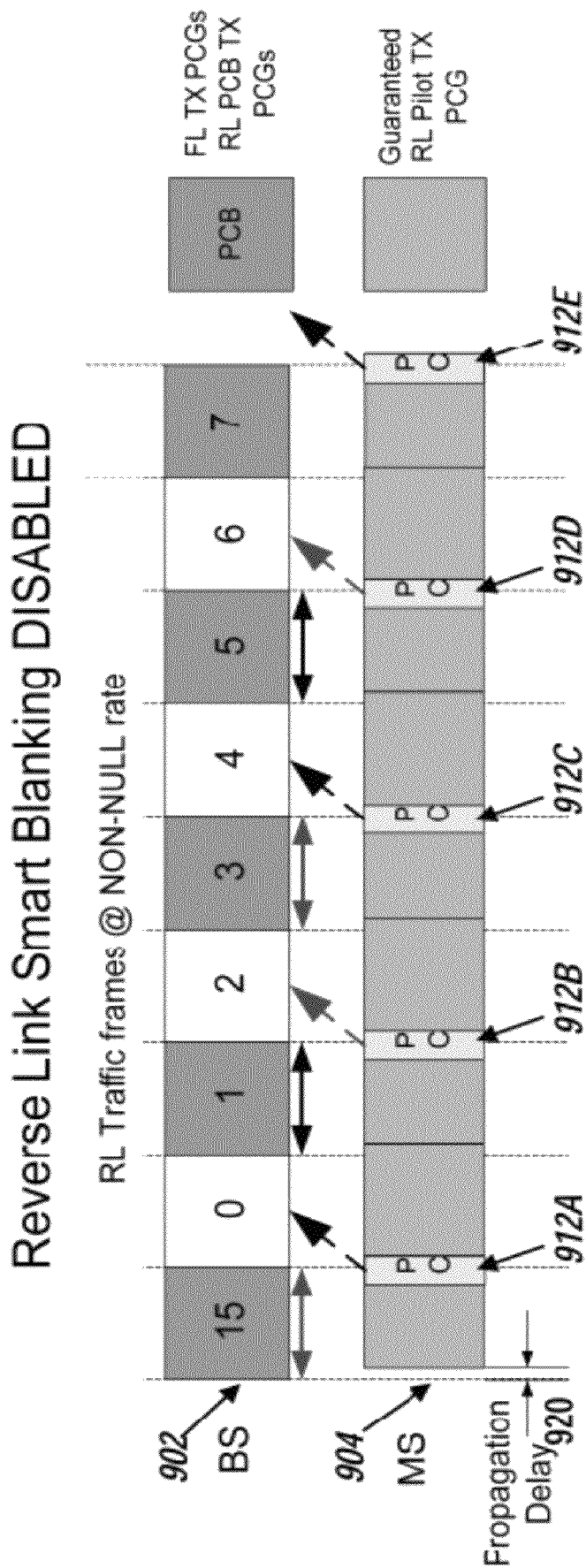
FIG. 9 is a block diagram illustrating an approach for Reverse Link Power Control with smart blanking disabled.

FIG. 9 is a block diagram illustrating an approach used in reverse link power control with smart blanking disabled. A mobile station 120 can use smart blanking to reduce the power used during transmissions by only transmitting half the time (i.e. half duty cycle) when the mobile station 120 does not detect sounds to transmit. For example, if a person using a mobile station 120 is not speaking and only listening, the mobile station 120 does not need to transmit any information because there is no information to transmit. If the mobile station 120 reduces the amount of transmissions during this period, when there is no information to transmit, energy can be conserved. Therefore, if smart blanking is enabled, then the mobile station 120 only transmits at half duty cycle or 8 PCGs, whereas if the smart blanking is disabled, then the mobile station 120 transmits at full duty cycle or during all 16 PCGs.

Frames 902 and 904 illustrate the transmission of a power control command from a MS 120 to a BS 110 at non-null rates with smart blanking disabled. Frame 902 includes PCGs 0, 1, 2, . . . , 15 transmitted from the BS 110 to the MS 120. Frame 904 includes PCGs 0, 1, 2, . . . , 15 with power control commands 912A-912E transmitted from the MS 120 to the BS 110. Frame 904 is offset in time from frame 902 by a propagation delay 920. The MS 120 transmits signals to the BS 110 via the pilot channel. The MS 120 transmits power control commands 912A-912E to the BS 110 commanding the BS 110 to change its transmission power by a predetermined amount. In one embodiment, the power control commands 912A-912E transmitted by the MS 120 are used to ensure that the MS 120 receives signals from the BS 110 having a minimum power level (i.e. a minimum quality) while at the same time minimizing the power usage. The power control commands 912A-912E is each shown as being transmitted at the end a power control group.

Frames 902 and 904, which are both 20 millisecond frames, each include 16 PCGs that are 1.25 milliseconds long and are identified as 0, 1, 2, . . . , 15. The power control command 912A is transmitted by the MS 120 to the BS 110, which receives the power control command in PCG 0 of frame 902. The base station 110 then adjusts its transmission power according to the power control command so that the base station's 110 transmission power of the next power control group (PCG 1) of frame 902 is adjusted in accordance with the received power control command. For example, the power control command 912A might instruct the base station 110 to increase its power output by one decibel if the signal received by the MS 120 is too low. Alternatively, the power control command 912A could instruct the BS 110 to decrease its power output by one decibel if the signal received by the MS 120 is too high. The MS 120 also transmits power control commands 912B-912E in frame 904 to base station's PCGs 2, 4, 6 and 8 (8 is not shown) in frame 902, respectively. Although not shown in the illustration, the BS 110 also transmits power control commands 912F-912H of frame 904 to PCGs 10, 12 and 14 of frame 902.

When the BS 110 receives the power control command at PCGs 0, 2, 4, and 6 of frame 902 the BS 110 adjusts its transmitted power in PCG 1, 3, 5 and 7 of frame 902. For example, when the BS 110 receives a power control command 912A in PCG 0 of frame 902, the BS 110 adjusts its transmitted power for PCGs 1 and 2 of frame 902 according to the power control command 912A received from the MS 120. When the BS 110 receives a power control command 912B in PCG 2 of frame 902, the BS 110 adjusts its transmitted power for PCGs 3 and 4 of frame 902, according to the power control command 912B received from the MS 120. When the BS 110 receives a power control command 912C in PCG 4 of frame 902, the BS 110 adjusts its transmitted power for PCGs 5 and 6 of frame 902, according to the power control command 912C received from the MS 120. When the BS 110 receives a power control command 912D in PCG 6 of frame 902, the BS 110 adjusts its transmitted power for PCGs 7 and 8 of frame 902, according to the power control command 912D received from the MS 120. When the BS 110 receives a power control command 912E in PCG 8 of frame 902, the BS 110 adjusts its transmitted power for PCGs 9 and 10 of frame 902, according to the power control command 912E received from the MS 120. Frames 902 and 904 show that power control commands 912A-912E are transmitted from the MS 120 to the BS 110 eight times during the 20 millisecond frame.

Figure 10:
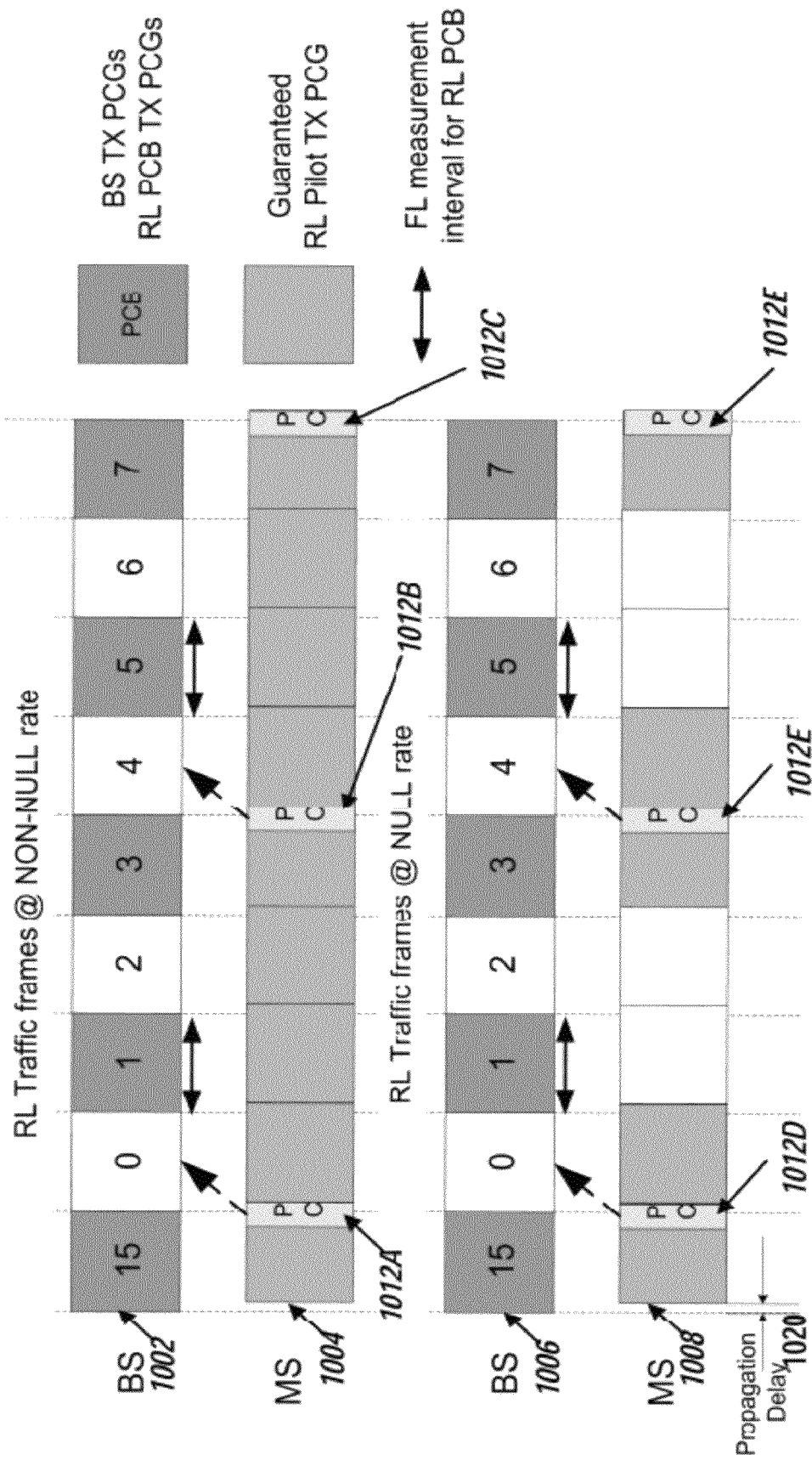
FIG. 10 is a block diagram illustrating an approach for Reverse Link Power Control with smart blanking enabled.

FIG. 10 is a block diagram illustrating an approach for Reverse Link Power Control with smart blanking enabled. As explained with reference to FIG. 9, since smart blanking is enabled, the mobile station 120 transmits at half duty cycle (i.e. during half of the 16 PCGs) when the mobile station 120 senses that there is no information to transmit and at full duty cycle (i.e. during all of the 16 PCGs) when the mobile station 120 senses that someone is speaking Frames 1002 and 1004 depict the scenario when the mobile station 120 transmits at full duty cycle while running with smart blanking enabled. Frames 1006 and 1008 depict the scenario when the mobile station 120 transmits at half duty cycle while also running with smart blanking enabled.

Frames 1002 and 1004 illustrate the transmission of power control commands from a MS 120 to a BS 110 at non-null rates whereas frames 1006 and 1008 illustrate the transmission of power control commands from a MS 120 to a BS 110 at null rates. Frames 1002, 1004, 1006 and 1008, which are all 20 millisecond frames, each include 16 PCGs that are 1.25 milliseconds long and are identified as 0, 1, 2, . . . , 15. Frames 1002 and 1006 include PCGs 0, 1, 2, . . . , 15 which are transmitted from the BS 110 to the MS 120. Frames 1004 and 1008 also include 16 PCGs with power control commands 1012A-1012C and 1012D-1012E respectively, which are transmitted from the MS 120 to the BS 110. Frames 1004 and 1008 are offset in time from frames 1002 and 1004, respectively, by a propagation delay 1020. The MS 120 transmits signals to the BS 110 via the pilot channel. The MS 120 transmits power control commands 1012A-1012E to the BS 110 instructing the BS 110 to change its transmission power by a predetermined amount. In one embodiment, the power control commands 1012A-1012E transmitted by the MS 120 are used to ensure that the MS 120 receives signals from the BS 110 having a minimum power level (i.e. a minimum quality) while at the same time minimizing the power usage. The power control commands 1012A-1012E is each shown as being transmitted at the end a power control group.

The power control commands 1012A and 1012D are transmitted by the MS 120 to the BS 110, which receives the power control command in PCG 0 of frames 1002 and 1006, respectively. The base station 110 then adjusts its transmission power according to the power control command so that the base station's transmission power of the next power control group (PCG 1) of frames 1002 and 1006 are adjusted in accordance with the received power control command. For example, the power control commands 1012A and 1012C might instruct the base station 110 to increase its power output by one decibel if the signal received by the MS 120 is too low. Alternatively, the power control commands 1012A and 1012C could instruct the BS 110 to decrease its power output by one decibel if the signal received by the MS 120 is too high. The MS 120 also transmits power control commands 1012B-1012C and 1012E-1012F of frames 1004 and 1008, respectively, to base station's PCGs 4 and 8 (8 is not shown) of frames 1002 and 1006, respectively. Although not shown in the illustration, the BS 110 also transmits power control commands 1012C and 1012E of frames 1004 and 1008, respectively, to PCG 12 of frames 1002 and 1006, respectively. When the BS 110 receives the power control command at PCGs 0, 4 and 8 of frames 1002 and 1006, the BS 110 adjusts its transmitted power in PCG 1, 5 and 9 of frames 1002 and 1006, respectively. For example, when the BS 110 receives power control commands 1012A and 1012D in PCG 0 of frames 1002 and 1006, respectively, the BS 110 adjusts its transmitted power for PCGs 1, 2, 3 and 4 of frames 1002 and 1006 respectively, according to the power control commands 1012A and 1012C, respectively, received from the MS 120. When the BS 110 receives power control commands 1012B and 1012D respectively, in PCG 4 of frames 1002 and 1006 respectively, the BS 110 adjusts its transmitted power for PCGs 5, 6, 7 and 8 of frames 1002 and 1006, respectively, according to the power control commands 1012B and 1012D, respectively, received from the MS 120. When the BS 110 receives power control commands 1012C and 1012E in PCG 8 of frames 1002 and 1006, the BS 110 adjusts its transmitted power for PCGs 9, 10, 11 and 12 of frames 1002 and 1006 respectively, according to the power control commands 1012C and 1012E, respectively, received from the MS 120. Frames 1002, 1004, 1006 and 1008 show that power control commands 1012A-1012E are transmitted from the MS 120 to the BS 110 four times during the 20 millisecond frames.

As used herein, a mobile station (MS) refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" includes devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" includes all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combinations of the above are also considered a "mobile station."

The blocks of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methodologies described herein may be implemented by various means depending upon the application. For example, these methodologies may be implemented in hardware, firmware, software, or any combination thereof. For an implementation involving hardware, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not to be limited to the examples and designs described herein but is to be accorded the widest scope consistent with the principles and novel features disclosed herein.

What is claimed is:

1. A method comprising:
   receiving at a first mobile station a first component of a first signal transmitted by a first base station, wherein the first signal comprises:
   the first component that has been coded using a spreading code; and
   a second component that has been coded using the spreading code;

wherein the first component is time domain multiplexed with the second component;
receiving at the first mobile station a third component of a second signal transmitted by a second base station; wherein the second signal comprises:
the third component that has been coded using the spreading code; and
a fourth component that has been coded using the spreading code;
wherein the third component is time domain multiplexed with the fourth component;
decoding at the first mobile station the first component and the third component;
wherein the first mobile station is in at least one of a soft or softer handoff condition with the first base station and the second base station, wherein the first component and the third component combined form a message, wherein the first component is different than the third component.

2. The method of claim 1 further comprising sending a signal to terminate sending data used to form the message.

3. The method of claim 1 wherein the first component and the third component are received by the mobile station at substantially the same time.

4. The method of claim 1 wherein the first component and the third component are received by the mobile station during a time period of less than 20 milliseconds.

5. The method of claim 1 wherein the second component and the fourth component are combined to form a complete message.

6. The method of claim 1 wherein the spreading code is an orthogonal code.

7. The method of claim 1 wherein the spreading code is a Walsh Code.

8. The method of claim 1 further comprising:
receiving at a second mobile station the second component of the first signal transmitted by the first base station;
receiving at the second mobile station the fourth component of the second signal transmitted by a second base station;
decoding at the second mobile station the second component and the fourth component; and
wherein the second mobile station is in a soft handoff condition with the first base station and the second base station.

9. The method of claim 1 further comprising sending a signal to the first base station and the second base station that data for a frame has been received.

10. The method of claim 1 wherein the first component is time domain multiplexed with the second component over a period of 20 milliseconds and the first component occupies the first 10 milliseconds and the second component occupies the second 10 milliseconds.

11. The method of claim 1 wherein the third component is time domain multiplexed with the fourth component over a period of 20 milliseconds and the third component occupies the first 10 milliseconds and the fourth component occupies the second 10 milliseconds.

12. A method comprising:
receiving at a first mobile station a first signal transmitted by a first base station; wherein the first signal comprises:
a first component that has been coded using a spreading code; and
a second component that has been coded using the spreading code;
wherein the first component is time domain multiplexed with the second component;
receiving at the first mobile station a second signal transmitted by a second base station; wherein the second signal comprises:
a third component that has been coded using the spreading code; and
a fourth component that has been coded using the spreading code;
wherein the third component is time domain multiplexed with the fourth component;
decoding at the first mobile station the first component and the third component; and
wherein the first component is different than the third component and the second component is different than the fourth component, and wherein the first component and the third component combined form a message.

13. A system comprising:
an antenna configured to transmit and receive data from a first base station and a second base station, wherein:
the data received from the first base station comprises a first component and a second component that have been coded using a spreading code;
the data received from the second base station comprises a third component and a fourth component that have been coded using the spreading code;
a memory configured to store instructions and to store data comprising the first component and the third component;
a processor configured to use the instructions to decode the first component and the third component; and
wherein the system is in at least one of a soft or softer handoff condition with the first base station and the second base station, wherein the first component and the third component combined form a message, wherein the first component is different than the third component.

14. The system of claim 13 wherein the processor is configured to decode the first component and the second component using a Walsh Code.

15. The system of claim 13 wherein the processor is further configured to determine that a complete message has been received and to prepare a signal requesting the first base station and the second base station stop sending data used to form the complete message.

16. A system comprising:
a means for receiving at a first mobile station a first component of a first signal transmitted by a first base station, wherein the first signal comprises:
the first component that has been coded using a spreading code; and
a second component that has been coded using the spreading code;
wherein the first component is time domain multiplexed with the second component;
a means for receiving at the first mobile station a third component of a second signal transmitted by a second base station; wherein the second signal comprises:
the third component that has been coded using the spreading code; and
a fourth component that has been coded using the spreading code;
wherein the third component is time domain multiplexed with the fourth component;
a means for decoding at the first mobile station the first component and the third component as part of
at least one of a soft or softer handoff transitioning between the first base station and the second base station, wherein the first component and the third component combined form a message, wherein the first component is different than the third component.

17. A computer program product comprising:
a non-transitory processor-readable medium storing processor-readable instructions configured to cause a processor to:
collect a first component of a first signal transmitted by a first base station, wherein the first signal comprises:
the first component that has been coded using a spreading code; and
a second component that has been coded using the spreading code;
wherein the first component is time domain multiplexed with the second component;
collect a third component of a second signal transmitted by a second base station; wherein the second signal comprises:
the third component that has been coded using the spreading code; and
a fourth component that has been coded using the spreading code;
wherein the third component is time domain multiplexed with the fourth component;
decode the first component and the third component; and
transition between the first base station and the second base station with at least one of a soft or softer handoff, wherein the first component and the third component combined form a message, wherein the first component is different than the third component.

18. The computer program product of claim 17 wherein the instructions are further configured to cause the processor to send a signal to terminate sending data used to form the message.

19. The computer program product of claim 17 wherein the instructions cause the processor to decode the first component and the third component are performed at substantially the same time.

20. The computer program product of claim 17 wherein the instructions cause the processor to decode the first component and the third component are performed during a time period of less than 20 milliseconds.

21. A method comprising:
dividing a first frame into components comprising a first component and a second component, wherein the first component is time domain multiplexed with the second component;
dividing a second frame into components comprising a third component and a fourth component, wherein the third component is time domain multiplexed with the fourth component;
encoding the first component, the second component, the third component and the fourth component with a spreading code;
transmitting at a first base station a first signal comprising the encoded first component and the encoded second component;
transmitting at a second base station a second signal comprising the encoded third component and the encoded fourth component, wherein the second signal is transmitted at substantially the same time as the first signal is transmitted; and
determining whether a third signal has been received from a mobile station indicating that transmission of the first signal and the second signal can be terminated; and
upon determining that the third signal has been received, stopping transmission of the first signal and the second signal, wherein the first component and the third component combined form a message, wherein the first component is different than the third component.

22. The method of claim 21 wherein the encoded second component and the encoded fourth component are combined to form a complete message.

23. The method of claim 21 wherein the spreading code is an orthogonal code.

24. The method of claim 21 wherein the spreading code is a Walsh Code.

25. The method of claim 21 wherein the first component is time domain multiplexed with the second component over a period of 20 milliseconds and the first component occupies the first 10 milliseconds and the second component occupies the second 10 milliseconds.

26. The method of claim 21 wherein the third component is time domain multiplexed with the fourth component over a period of 20 milliseconds and the third component occupies the first 10 milliseconds and the fourth component occupies the second 10 milliseconds.

27. A system comprising:
a processor configured to:
divide a first frame into components comprising a first component and a third component, wherein the first component is time domain multiplexed with the second component;
divide a second frame into components comprising a second component and a fourth component, wherein the third component is time domain multiplexed with the fourth component;
encode the first component, the second component, the third component and the fourth component with a spreading code;
a base station interface configured to:
transmit the encoded first component and the encoded second component to a first base station;
transmit the encoded third component and the encoded fourth component to a second base station;
the first base station configured to transmit the encoded first component and the encoded second component;
the second base station configured to transmit the encoded third component and the encoded fourth component at substantially the same time as the first base station transmits the encoded first component and the encoded second component; and
wherein the first base station and the second base station are in at least one of soft or softer handoff conditions with a mobile station, wherein the first component and the third component combined form a message, wherein the first component is different than the third component.

28. A system comprising:
a means for encoding a first component, a second component, a third component and a fourth component with a spreading code, wherein a first frame is divided into components comprising the first component and the third component, wherein the first component is time domain multiplexed with the second component, wherein a second frame is divided into components comprising the second component and the fourth component, wherein the third component is time domain multiplexed with the fourth component;
a means for transmitting from a first base station the encoded first component and the encoded second component; and
a means for transmitting from a second base station the encoded third component and the encoded fourth component at substantially the same time as the first base station transmits the encoded first component and the encoded second component as part of
a means for at least one of a soft or softer handoff transitioning between a mobile station, the first base station and the second base station, wherein the first component and the third component combined form a message, wherein the first component is different than the third component.

29. A computer program product comprising:

a non-transitory processor-readable medium storing processor-readable instructions configured to cause a processor to:

divide a first frame into components comprising a first component and a third component, wherein the first component is time domain multiplexed with the second component;

divide a second frame into components comprising a second component and a fourth component, wherein the third component is time domain multiplexed with the fourth component;

encode the first component, the second component, the third component and the fourth component with a spreading code;

transmit at a first base station the encoded first component and the encoded second component;

transmit at a second base station the encoded third component and the encoded fourth component at substantially the same time as the first base station transmits the encoded first component and the encoded second component, wherein the first component and the third component combined form a message, wherein the first component is different than the third component.

* * * * *